(12) United States Patent
Williams et al.

(10) Patent No.: US 11,426,683 B2
(45) Date of Patent: Aug. 30, 2022

(54) NEGATIVE PRESSURE FILTRATION APPARATUS, METHOD, AND SYSTEM

(71) Applicants: Gregg Lynn Williams, Round Rock, TX (US); Edward Frank Gelsone, Spring Branch, TX (US)

(72) Inventors: Gregg Lynn Williams, Round Rock, TX (US); Edward Frank Gelsone, Spring Branch, TX (US)

( * ) Notice: Subject to any disclaimer, the term of this patent is extended or adjusted under 35 U.S.C. 154(b) by 0 days.

(21) Appl. No.: 17/600,050

(22) PCT Filed: Mar. 27, 2020

(86) PCT No.: PCT/US2020/025198
§ 371 (c)(1),
(2) Date: Sep. 29, 2021

(87) PCT Pub. No.: WO2020/205509
PCT Pub. Date: Oct. 8, 2020

(65) Prior Publication Data
US 2022/0096971 A1    Mar. 31, 2022

Related U.S. Application Data

(60) Provisional application No. 62/828,902, filed on Apr. 3, 2019.

(51) Int. Cl.
| | | |
|---|---|---|
| *B01D 29/90* | (2006.01) | |
| *B01D 29/05* | (2006.01) | |
| *B01D 29/60* | (2006.01) | |
| *B01D 37/04* | (2006.01) | |

(52) U.S. Cl.
CPC .......... *B01D 29/904* (2013.01); *B01D 29/05* (2013.01); *B01D 29/606* (2013.01); *B01D 29/902* (2013.01); *B01D 37/046* (2013.01); *B01D 2201/204* (2013.01)

(58) Field of Classification Search
CPC .... B01D 29/904; B01D 29/62; B01D 29/606; B01D 37/046; B01D 2201/204
See application file for complete search history.

(56) References Cited

U.S. PATENT DOCUMENTS

| | | | |
|---|---|---|---|
| 2,985,307 A | 5/1961 | Grasmere et al. | |
| 3,037,634 A | 6/1962 | Mills | |
| 3,186,550 A | 6/1965 | Beduhn | |
| 3,363,769 A * | 1/1968 | Wilmot | B01D 29/904 |
| | | | 210/323.1 |
| 3,405,058 A | 10/1968 | Miller | |
| 3,935,106 A | 1/1976 | Lipner | |
| 3,996,136 A | 12/1976 | Jakubek et al. | |
| 4,066,551 A | 1/1978 | Stern | |
| 4,436,633 A | 3/1984 | Robinsky et al. | |
| 4,460,467 A | 7/1984 | Ueda | |

(Continued)

FOREIGN PATENT DOCUMENTS

GB    2 077 132 B    1/1984

*Primary Examiner* — Benjamin M Kurtz
(74) *Attorney, Agent, or Firm* — Sean Christian Connolly

(57) ABSTRACT

Disclosed herein is a method, system, and apparatus, for filtering liquid, which uses negative air pressure to draw liquid stream through a filter screen and which cleans that filter screen by periodically modulating the negative air pressure to allow the liquid stream to wash any contaminants from the surface of the filter screen.

12 Claims, 24 Drawing Sheets

(56) References Cited

U.S. PATENT DOCUMENTS

| | | |
|---|---|---|
| 4,490,250 A | 12/1984 | Dockery |
| 4,627,118 A | 12/1986 | Baker |
| 5,133,871 A | 7/1992 | Levy |
| 5,143,606 A | 9/1992 | Bernhardt |
| 5,232,582 A | 8/1993 | Takahashi et al. |
| 5,273,649 A | 12/1993 | Magnusson et al. |
| 5,343,592 A | 9/1994 | Parise |
| 5,401,405 A | 3/1995 | McDougald |
| 5,545,315 A | 8/1996 | Lonneman |
| 5,558,042 A | 9/1996 | Bradley et al. |
| 5,647,982 A | 7/1997 | Haythornthwaite |
| 5,665,245 A | 9/1997 | Kloss et al. |
| 5,688,588 A | 11/1997 | Cotton et al. |
| 5,817,231 A | 10/1998 | Souza |
| 5,839,142 A * | 11/1998 | Bolton ................. B01D 29/78 210/406 |
| 5,922,093 A | 7/1999 | James et al. |
| 6,187,179 B1 | 2/2001 | Mayer et al. |
| 6,375,848 B1 | 4/2002 | Cote et al. |
| 6,491,811 B2 | 12/2002 | Conrad et al. |
| 6,531,059 B1 | 3/2003 | Morris et al. |
| 6,569,329 B1 | 5/2003 | Nohren |
| 6,595,277 B2 | 6/2003 | Zins et al. |
| 7,381,323 B2 | 6/2008 | Umezawa et al. |
| 7,390,343 B2 | 6/2008 | Tepper et al. |
| 7,473,362 B1 | 1/2009 | Nohren |
| 7,857,806 B2 | 12/2010 | Karpowicz et al. |
| 8,097,128 B1 | 1/2012 | Sherry |
| 8,097,159 B1 | 1/2012 | Peng |
| 8,216,462 B2 | 7/2012 | O'Brien et al. |
| 2002/0060177 A1 | 5/2002 | Conrad |
| 2002/0060189 A1 | 5/2002 | Conrad |
| 2005/0108849 A1 | 5/2005 | Lam |
| 2005/0230325 A1 | 10/2005 | Miller |
| 2005/0279696 A1 | 12/2005 | Bahm et al. |
| 2006/0070956 A1 | 4/2006 | Herrmann et al. |
| 2007/0102332 A1 | 5/2007 | Bommi et al. |
| 2008/0023405 A1 | 1/2008 | Rawson et al. |
| 2008/0073288 A1 | 3/2008 | Fan et al. |
| 2008/0217223 A1 | 9/2008 | Uchino |
| 2009/0045135 A1 | 2/2009 | Khudenko et al. |
| 2009/0314703 A1 | 12/2009 | Beach et al. |
| 2010/0102002 A1 | 4/2010 | O'Brien et al. |
| 2010/0213141 A1 | 8/2010 | Griffin et al. |
| 2011/0196321 A1 | 8/2011 | Wudyka |
| 2011/0303589 A1 | 12/2011 | Kuennen et al. |
| 2014/0020562 A1 * | 1/2014 | Both ................. E21C 35/223 96/297 |
| 2014/0197094 A1 | 7/2014 | Rogers et al. |
| 2020/0095048 A1 * | 3/2020 | Tosi ................. B65D 81/2038 |

* cited by examiner

NEGATIVE PRESSURE FILTRATION APPARATUS, METHOD, AND SYSTEM

CROSS-REFERENCE TO RELATED APPLICATIONS

This application claims benefit of U.S. Provisional Patent Application No. 62/828,902, which was filed on Apr. 3, 2019, and which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of filtering devices, apparatuses, methods, and systems. More particularly, the preferred embodiments of the present invention relate generally to filtering devices, apparatuses, methods, and systems, which filter liquids. More particularly, the preferred embodiments of the present invention relate generally to filtering devices, apparatuses, methods, and systems, which use screen filters to filter liquids. More particularly, the preferred embodiments of the present invention relate generally to filtering devices, apparatuses, methods, and systems, which use textile screen filters to filter liquids. More particularly, the preferred embodiments of the present invention relate generally to filtering devices, apparatuses, methods, and systems, which use pressure differentials. More particularly, the preferred embodiments of the present invention relate generally to filtering devices, apparatuses, methods, and systems, which use negative pressure. More particularly, the preferred embodiments of the present invention relate generally to filtering devices, apparatuses, methods, and systems, which use negative air pressure. More particularly, the preferred embodiments of the present invention relate generally to filtering devices, apparatuses, methods, and systems, which use negative air pressure to filter liquids. More particularly, the preferred embodiments of the present invention relate generally to filtering devices, apparatuses, methods, and systems, which use negative air pressure to filter liquids through textile screen filters.

2. Description of the Related Art

The broad concept of methods, apparatus, and systems for filtering liquids is known. However, most of these inventions require filters that are expensive or inefficient.

Filtering liquids using mechanical filters is also known. However, these inventions usually expensive filters that are susceptible to blockage and require frequent replacement.

It is also known to filter liquids using screens. However, these screens have issues with fine holes, which may prevent liquid from flowing through the screens due to its surface tension.

It is also known to filtering liquids using negative pressure. However, these systems usually apply negative pressure to move the liquid.

Additionally, filtering liquids using negative air pressure is known. However, these filters are used for cleaning air and not liquids.

Further, self-cleaning filter systems are also known. However, these inventions use brushes or complicated mechanical systems to clean the filters.

Moreover, it is also known to use self-cleaning filter systems that use negative pressure. However, theses inventions rely on negative pressure to directly remove contaminates from the surface of the filter though suction and do not use liquid pressure to wash the filter clean.

SUMMARY OF THE INVENTION

Filtration of contaminated liquids is often obtained through the use of mechanical filters. These mechanical filters physically prevent contaminants from passing though the filter while allowing the liquid to pass through the filter without the contaminants. In most cases, this type of filtration uses a porous filter with small pores or holes, which are smaller than the contaminants being removed from the liquid. Smaller pores or holes are able to remove smaller and finer contaminants for improved filtration of the contaminated liquid; however, as the size of the pore or hole decreases, the surface tension of the liquid may prevent the liquid from efficiently passing through the filter. Additionally, contaminants that are prevented from passing through the filter are susceptible to accumulation on the filter, which further prevents the liquid from passing through the filter. These mechanical filters can be expensive or require frequent cleaning or replacement to continue operation. Because of these susceptibilities, the challenge presented is to develop a method, system and apparatus for filtering liquids, which addresses these problems, while maintaining the high quality of the filtered liquid.

The Negative Pressure Filtration Apparatus, Method, and System invention was developed in part to provide a method, system, and apparatus, for filtering liquids, which allows the use of inexpensive filters with small pores or holes that are easy to clean, while maintaining the high quality of the filtered liquid. In broad embodiment, the Negative Pressure Filtration Apparatus, Method, and System invention relates to a method, system, and apparatus, for filtering liquid, which uses negative air pressure to draw liquid stream through a filter screen and which cleans that filter screen by periodically modulating the negative air pressure to allow the liquid stream to wash any contaminants from the surface of the filter screen. The Negative Pressure Filtration Apparatus, Method, and System invention comprises a liquid pump; a box; a frame disposed within the box; a screen comprising small holes that is attached to the frame with seals around and under the screen to prevent air and liquid from moving around the side of the frame; a vent hole in the box behind the screen for removing air behind the screen; an air suction unit connected to the vent hole; an air flow regulator; a drain hole in the box behind the screen for removing liquid from behind the screen, which connects to a drain pipe; a small chamber, which connect to the drain pipe; and a receptacle for collecting contaminants. In the small chamber are tubes, which protrude up from the bottom of the small chamber and surround the drain pipes and which are always filled with liquid. As liquid flows down the drain pipe it then must flow over the top of the tubes to drain out of the small chamber, thereby preventing air from entering the area behind the screen from the drain pipe. The frame is set at an angle anywhere from 45 degrees to 90 degrees (ideal it is around 60-63 degrees), but may also be positioned horizontally. The screen comprises stainless steel, nylon, polyester, composite, cloth, or other like material, and may or may not be stretched over the frame. The hole size in the screen can vary from as low as 5 microns to as much as 1 centimeter, but in most cases the screen size will be under 250 microns. The air suction unit comprises a vacuum pump or a motor/fan unit and can be located in the building, or outside the building depending on the customer preference. The air flow regulator may use a negative pressure controller or can be done manually with valves. The automatic system uses a variable speed motor on the air suction unit that adjusts to meet the required flow and negative pressure. During operation, the liquid pump passes contaminated liquid over the screen and, using the vacuum pump, air is removed from behind the screen to create a negative pressure behind the screen. This negative pressure breaks or weakens the surface tension of the liquid being treated and allows the liquid to easily pass through the screen leaving any material larger than the screen openings on the surface of the screen. As solids build on the screen, the negative air pressure is decreased so that a small amount of liquid runs down the face of the screen, thereby pushing all the solids to the bottom face of the screen and eventually into the receptacle. As the negative pressure is increased the liquid again flows through the screen. The liquid being treated is directed at the screen in a stream or streams with a specific velocity and at a specific angle in order to prevent splashback and allow multiple streams to be directed onto one screen, which gives a higher flow rate. The more streams that are directed at the screen, the lower the negative air pressure that is required because more of the screen is covered in liquid; however, too much liquid will block the screen because the air flow is reduced too much, so air must always flow through the unused parts of the screen in order to help the liquid pass through the screen. In some embodiments, a gas other than air could be used and re-circulated through the screen, in order to separate solids from a liquid that should not or cannot come in contact with air. All solid are collected in the receptacle located at the front bottom of the screen unit, which may further comprise wheels for ease of movement. The screen unit can be mounted directly to the receptacle or sit on its own frame elevated off the ground so the receptacle can be rolled under the screen discharge area. In more detail, the Negative Pressure Filtration Apparatus is an apparatus for filtering contaminated liquid, said contaminated liquid comprising liquid and contaminants, said apparatus comprising: a box; said box comprising: a frame disposed within said box, said frame dividing said box into a negative air pressure region and an atmospheric air pressure region; a screen, said screen being sealably attached to said frame between said negative air pressure region and said atmospheric air pressure region in such a manner to prevent air and liquid from moving between said frame and said screen, said screen comprising: a surface, and small holes, said small holes being smaller than said contaminants; a vent hole, said vent hole being disposed in said negative air pressure region; a drain hole, said drain hole being disposed in said negative pressure region; one or more inlet pipes; a drain pipe, said drain pipe being connected to said drain hole; and a small chamber, which receives said drain pipe, said small chamber comprising: an airlock and a chamber drain pipe; and a liquid pump, said liquid pump depending from said one or more inlet pipes; an air suction unit, said air suction unit being connected to said vent hole; an air flow regulator, said air flow regulator being capable of modulating air flow through said vent hole; and a receptacle; whereby said liquid pump forces a liquid stream of said contaminated liquid through said one or more inlet pipes and onto said surface of said screen in said atmospheric air pressure region; whereby said air suction unit removes air from said negative air pressure region thereby creating negative air pressure in said negative air pressure region; whereby said negative air pressure draws said liquid through said screen while depositing said contaminants on said surface of said screen, whereby said screen is washed of said contaminants by using said air flow regulator to periodically modulate said negative air pressure to allow said liquid stream to wash said contaminants from said surface of said screen; whereby said contaminants are collected in said receptacle; and whereby uncontaminated said liquid is collected in said small chamber and flows out of said chamber drain pipe. Some versions of the Negative Pressure Filtration Apparatus comprise an air flow regulator that is operated manually, while other versions comprise an air flow regulator that is operated automatically. In other versions the air flow regulator comprises a knife gate. Additionally, other versions have one or more inlet pipes, which further comprise an actuator, whereby the surface of the screen is washed of contaminants by moving one or more inlet pipes across the surface of the screen using the actuator. Further, other versions of the apparatus have an air suction unit, which further comprises a variable speed motor for adjusting air flow and vacuum pressure. Moreover, other versions comprise a sound-proof exterior to reduce the noise produced by the apparatus during operation. Further still in more detail, the Negative Pressure Filtration Method is a method for filtering contaminated liquid, said contaminated liquid comprising liquid and contaminants, said method comprising: providing a box; said box comprising: a frame disposed within said box, said frame dividing said box into a negative air pressure region and an atmospheric air pressure region; a screen, said screen being sealably attached to said frame between said negative air pressure region and said atmospheric air pressure region in such a manner to prevent air and liquid from moving between said frame and said screen, said screen comprising: a surface, and small holes, said small holes being smaller than said contaminants; a vent hole, said vent hole being disposed in said negative air pressure region; a drain hole, said drain hole being disposed in said negative pressure region; one or more inlet pipes; a drain pipe, said drain pipe being connected to said drain hole; and a small chamber, which receives said drain pipe, said small chamber comprising: an airlock and a chamber drain pipe; and providing a liquid pump, said liquid pump depending from said one or more inlet pipes; providing an air suction unit, said air suction unit being connected to said vent hole; providing an air flow regulator, said air flow regulator being capable of modulating air flow through said vent hole; providing a receptacle; forcing a liquid stream of said contaminated liquid through said one or more inlet pipes and onto said surface of said screen in said atmospheric air pressure region using said liquid pump; removing air from said negative air pressure region, thereby creating negative air pressure in said negative air pressure region, using said air suction unit; using said negative air pressure to draw said liquid through said screen while depositing said contaminants on said surface of said screen; washing said contaminants from said surface of screen by using said air flow regulator to periodically modulate said negative air pressure to allow said liquid stream to wash said contaminants from said surface of said screen; collecting said contaminants in said receptacle; collecting uncontaminated said liquid in said small chamber; and flowing uncontaminated said liquid out of said chamber drain pipe. Some versions of the Negative Pressure Filtration Method comprise an air flow regulator that is operated manually, while other versions comprise an air flow regulator that is operated automatically. In other versions the air flow regulator comprises a knife gate. Additionally, other versions of the method have one or more inlet pipes, which further comprise an actuator, and further comprise washing said contaminants from the surface of the screen by moving the one or more inlet pipes across the surface of the screen using the actuator. Further, other versions of the method have an air suction unit, which further comprises a variable speed motor for adjusting air flow and vacuum pressure. Moreover, other versions comprise a sound-proof exterior to reduce the noise produced by the method during operation. Still further in more detail, the Negative Pressure Filtration System, is a system for filtering contaminated liquid, said contaminated liquid comprising liquid and contaminants, said system comprising: a box; said box comprising: a frame disposed within said box, said frame dividing said box into a negative air pressure region and an atmospheric air pressure region; a screen, said screen being sealably attached to said frame between said negative air pressure region and said atmospheric air pressure region in such a manner to prevent air and liquid from moving between said frame and said screen, said screen comprising: a surface, and small holes, said small holes being smaller than said contaminants; a vent hole, said vent hole being disposed in said negative air pressure region; a drain hole, said drain hole being disposed in said negative pressure region; one or more inlet pipes; a drain pipe, said drain pipe being connected to said drain hole; and a small chamber, which receives said drain pipe, said small chamber comprising: an airlock and a chamber drain pipe; and a liquid pump unit, said liquid pump unit depending from said one or more inlet pipes; an air suction unit, said air suction unit being connected to said vent hole; an air flow regulator unit, said air flow regulator unit being capable of modulating air flow through said vent hole; and a receptacle unit; whereby said liquid pump unit forces a liquid stream of said contaminated liquid through said one or more inlet pipes and onto said surface of said screen in said atmospheric air pressure region; whereby said air suction unit removes air from said negative air pressure region thereby creating negative air pressure in said negative air pressure region; whereby said negative air pressure draws said liquid through said screen while depositing said contaminants on said surface of said screen, whereby said screen is washed of said contaminants by using said air flow regulator unit to periodically modulate said negative air pressure to allow said liquid stream to wash said contaminants from said surface of said screen; whereby said contaminants are collected in said receptacle unit; and whereby uncontaminated said liquid is collected in said small chamber and flows out of said chamber drain pipe. The system comprises a set of separate units, which act together in a similar manner as the apparatus. Some versions of the Negative Pressure Filtration System comprise an air flow regulator that is operated manually, while other versions comprise an air flow regulator that is operated automatically. In other versions the air flow regulator comprises a knife gate. Additionally, other versions have one or more inlet pipes, which further comprise an actuator, whereby the surface of the screen is washed of contaminants by moving one or more inlet pipes across the surface of the screen using the actuator. Further, other versions of the system have an air suction unit, which further comprises a variable speed motor for adjusting air flow and vacuum pressure. Moreover, other versions comprise a sound-proof exterior to reduce the noise produced by the system during operation.

In the more preferred embodiments, the present invention relates to an apparatus, as described above, which uses a manual slide gate to release the negative pressure in order to clean off the filter when contaminants build up.

In the most preferred embodiments, the present invention relates to an apparatus, as described above, which also includes an automated knife gate that uses a timer to periodically release the negative pressure in order to clean off the filter at regular intervals. The automated knife gate also has a switch to allow for the negative pressure to be released on demand.

Accordingly, a Negative Pressure Filtration Method comprises drawing a fluid through a screen filter using a vacuum and periodically releasing the vacuum to wash filtered material from the screen. Similarly, a Negative Pressure Filtration System comprises the above apparatus and a fluid pump, a vacuum pump, unfiltered fluid supply sources, filtered fluid collection chambers, contaminant collection chambers, solid collection chambers, and connecting conduits, pipes, and hoses, or the like. In sum, the Negative Pressure Filtration Apparatus, Method, and System invention provides a relatively inexpensive and efficient solution for filtering contaminated liquid.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the most preferred embodiment of a negative pressure filtration apparatus, which uses an automated knife gate. Additionally, for the purpose of illustration, the present invention is shown in another preferred embodiment of a negative pressure filtration apparatus, which uses a manual knife gate. These embodiments are not intended to limit the scope of the present invention.

Figure 1:
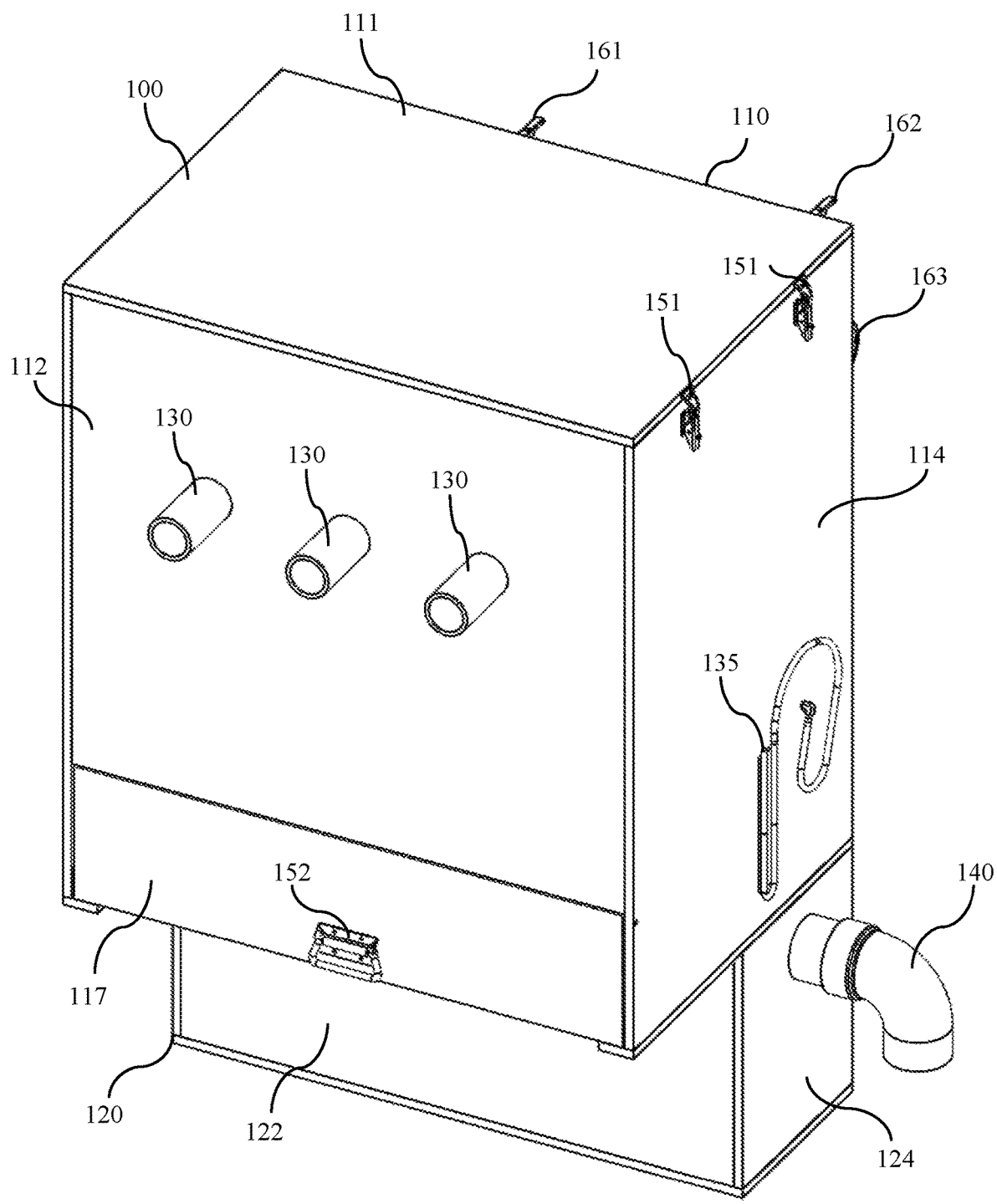
FIG. 1 is a front perspective view of the most preferred embodiment of an apparatus of the present invention.
Figure 2:
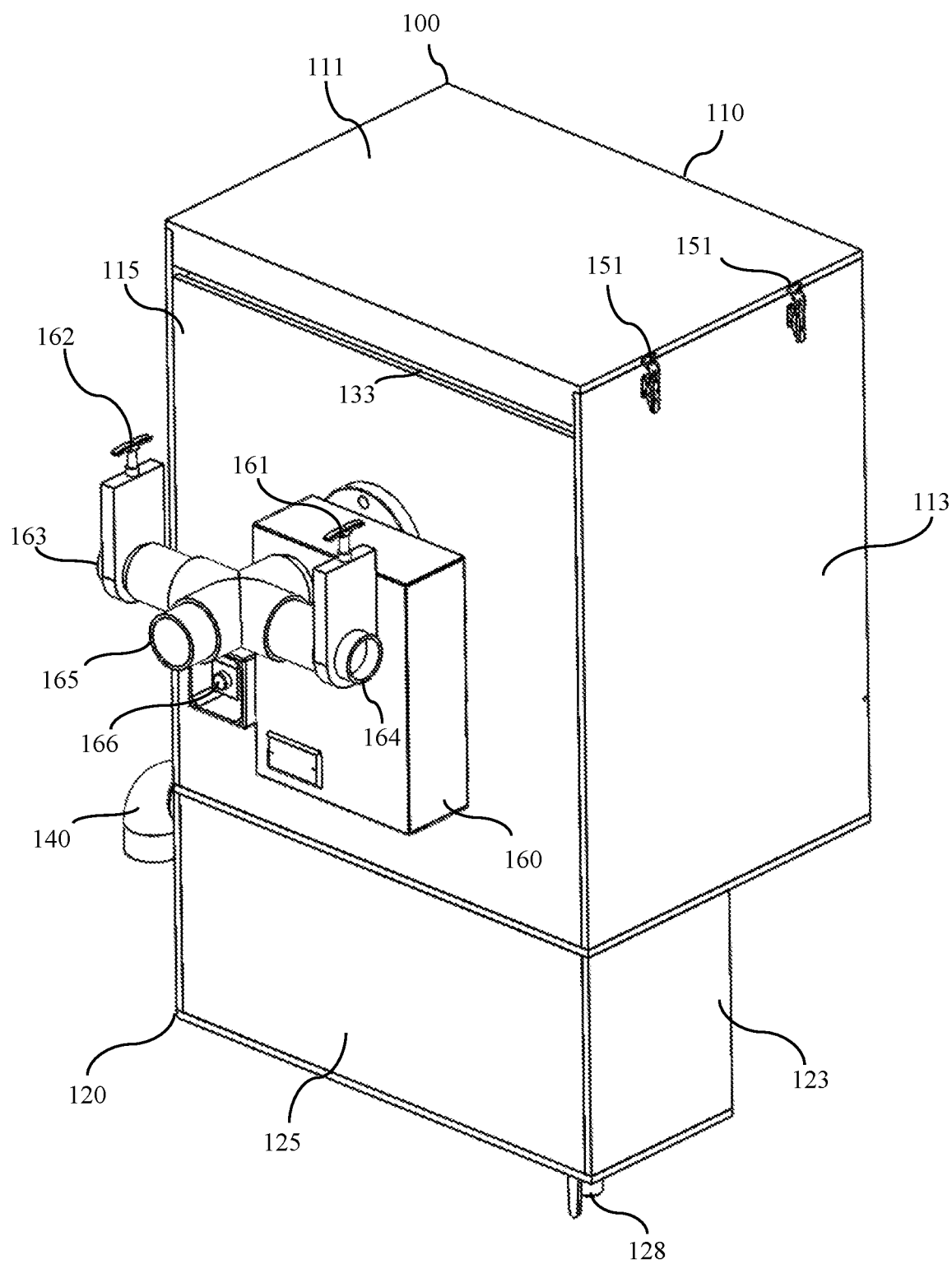
FIG. 2 is a rear perspective view of an apparatus of FIG. 1.
Figure 3:
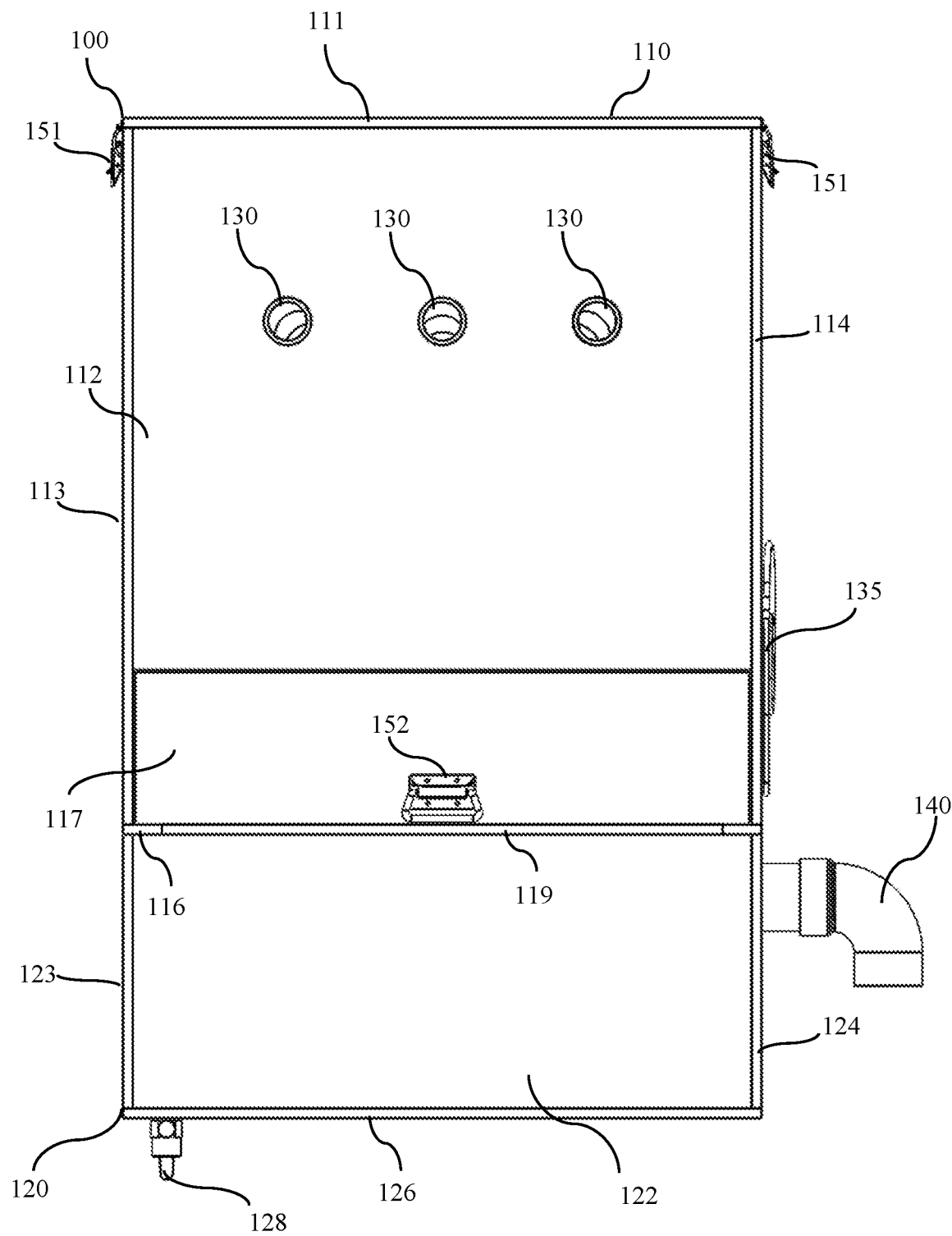
FIG. 3 is a front view of an apparatus of FIG. 1.
Figure 4:
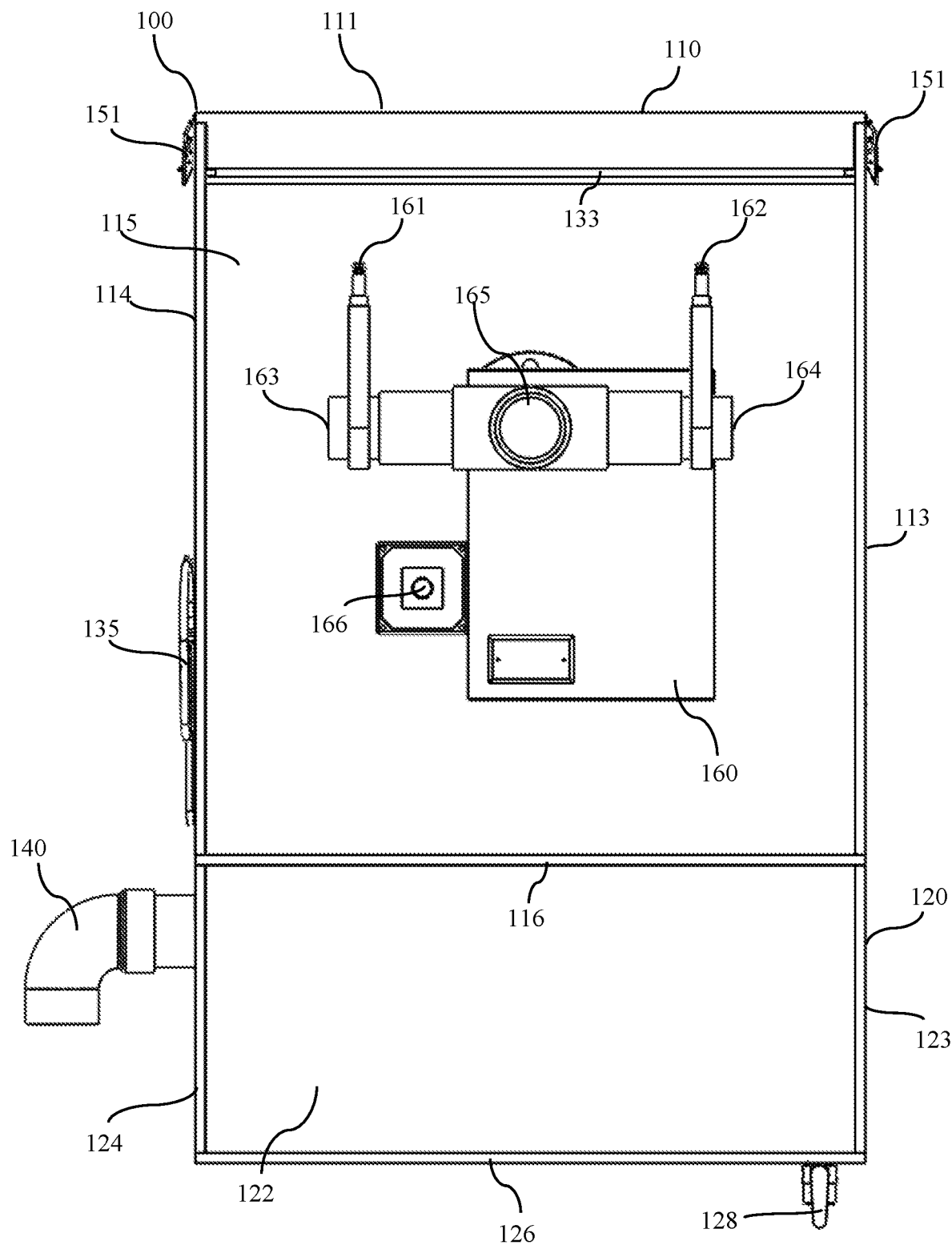
FIG. 4 is a rear view of an apparatus of FIG. 1.
Figure 5:
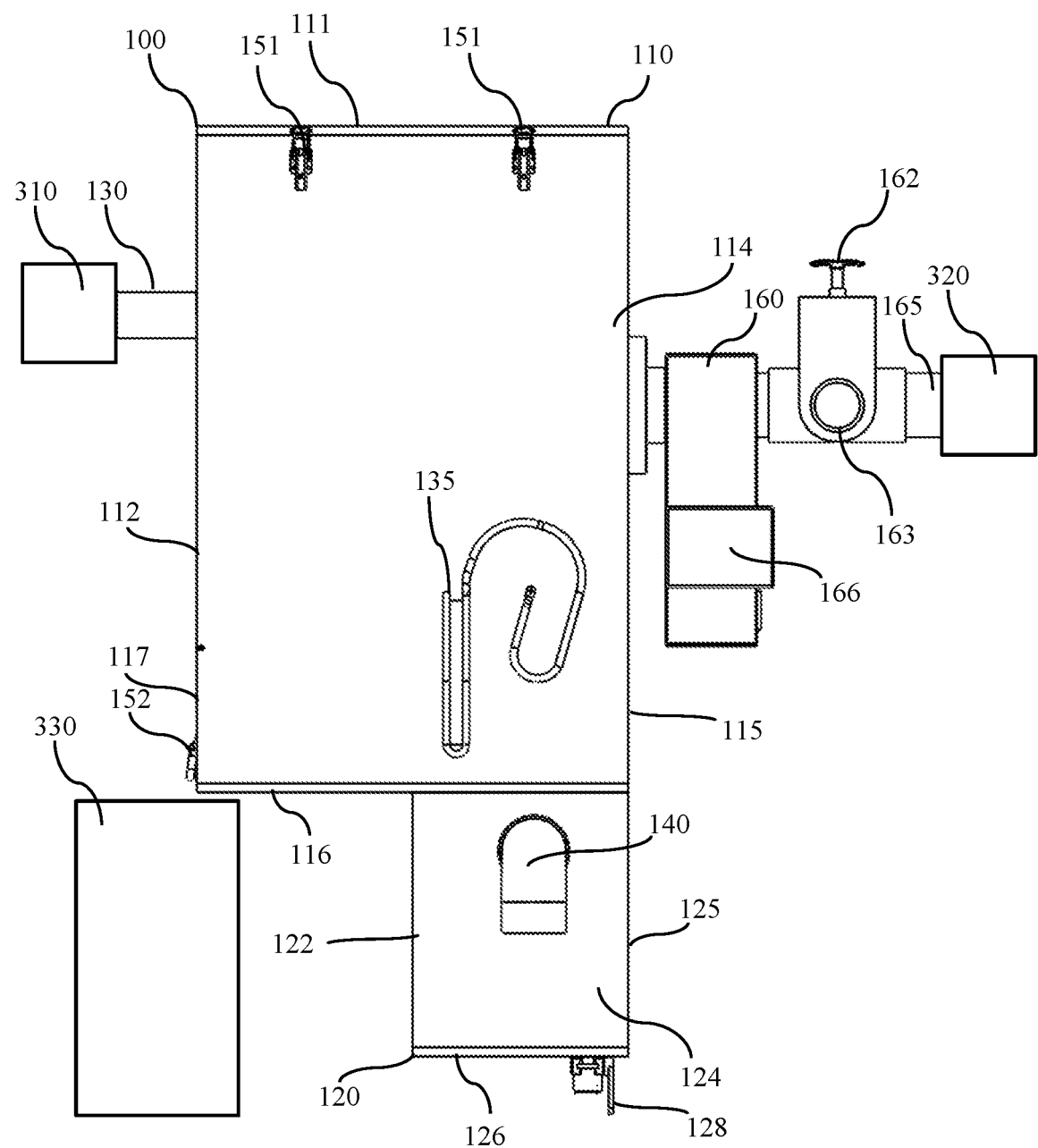
FIG. 5 is a right side view of an apparatus of FIG. 1 arranged with the fluid pump 310, vacuum pump 320, and receptacle 330.
Figure 6:
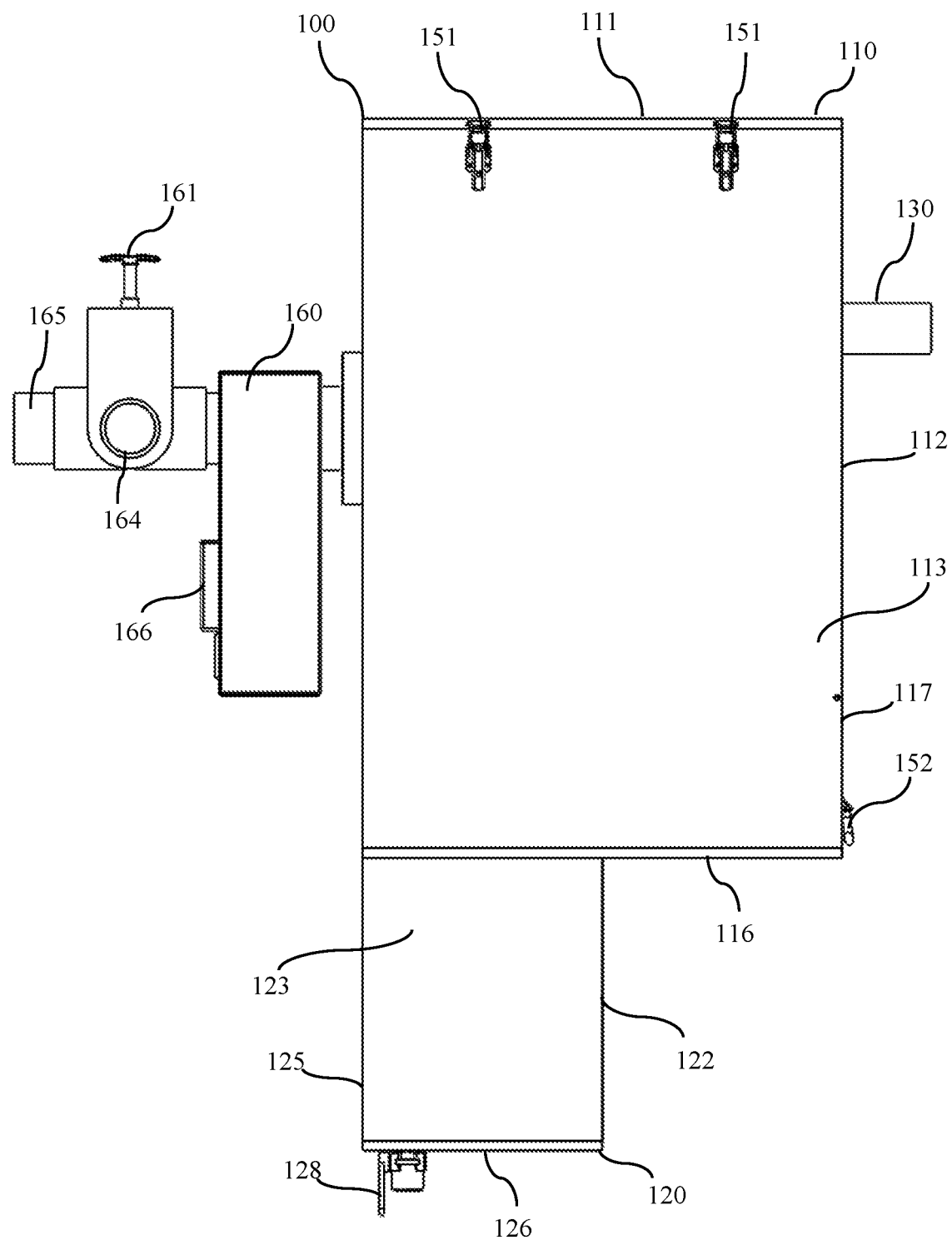
FIG. 6 is a left side view of an apparatus of FIG. 1.
Figure 7:
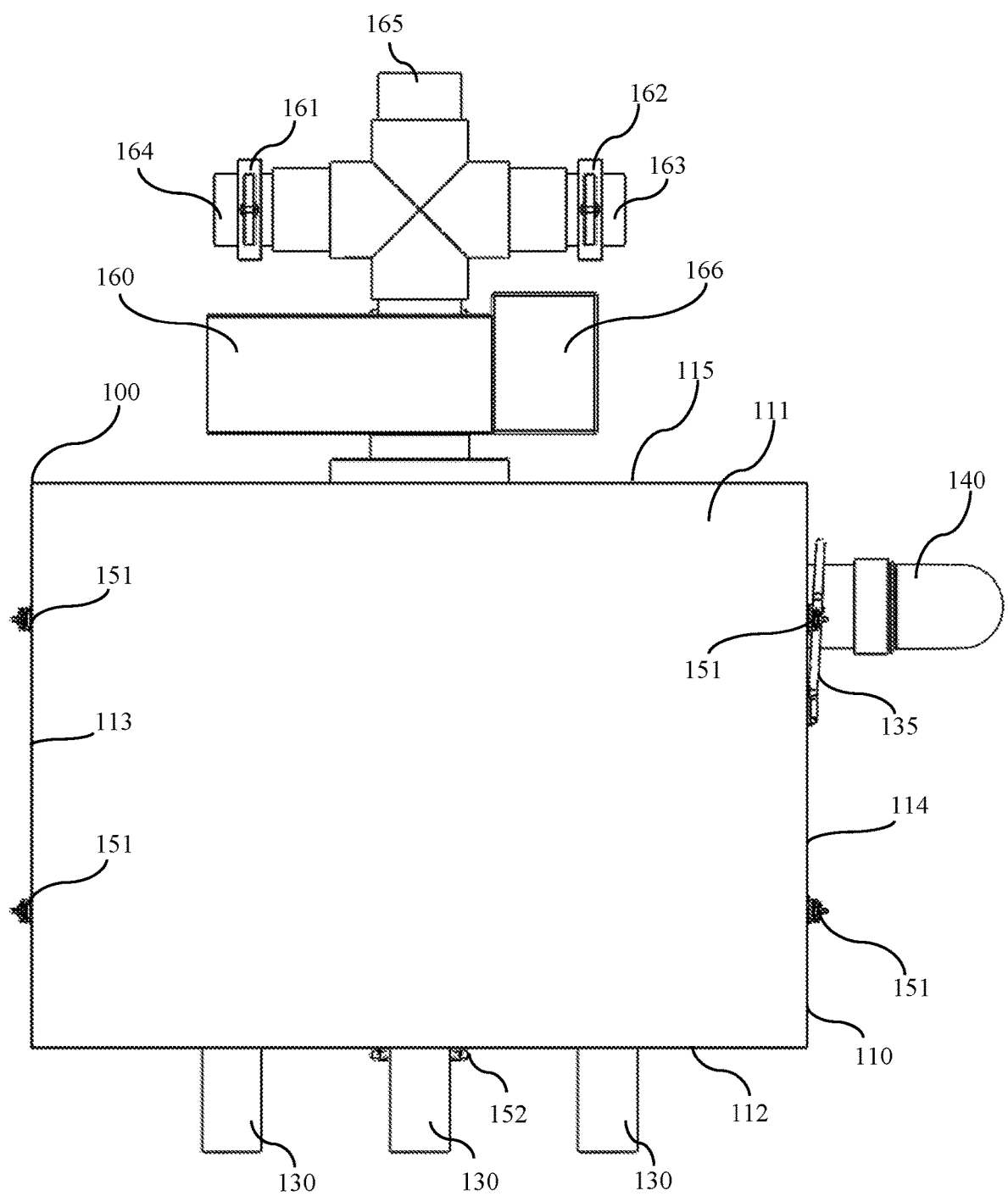
FIG. 7 is a top view of an apparatus of FIG. 1.
Figure 8:
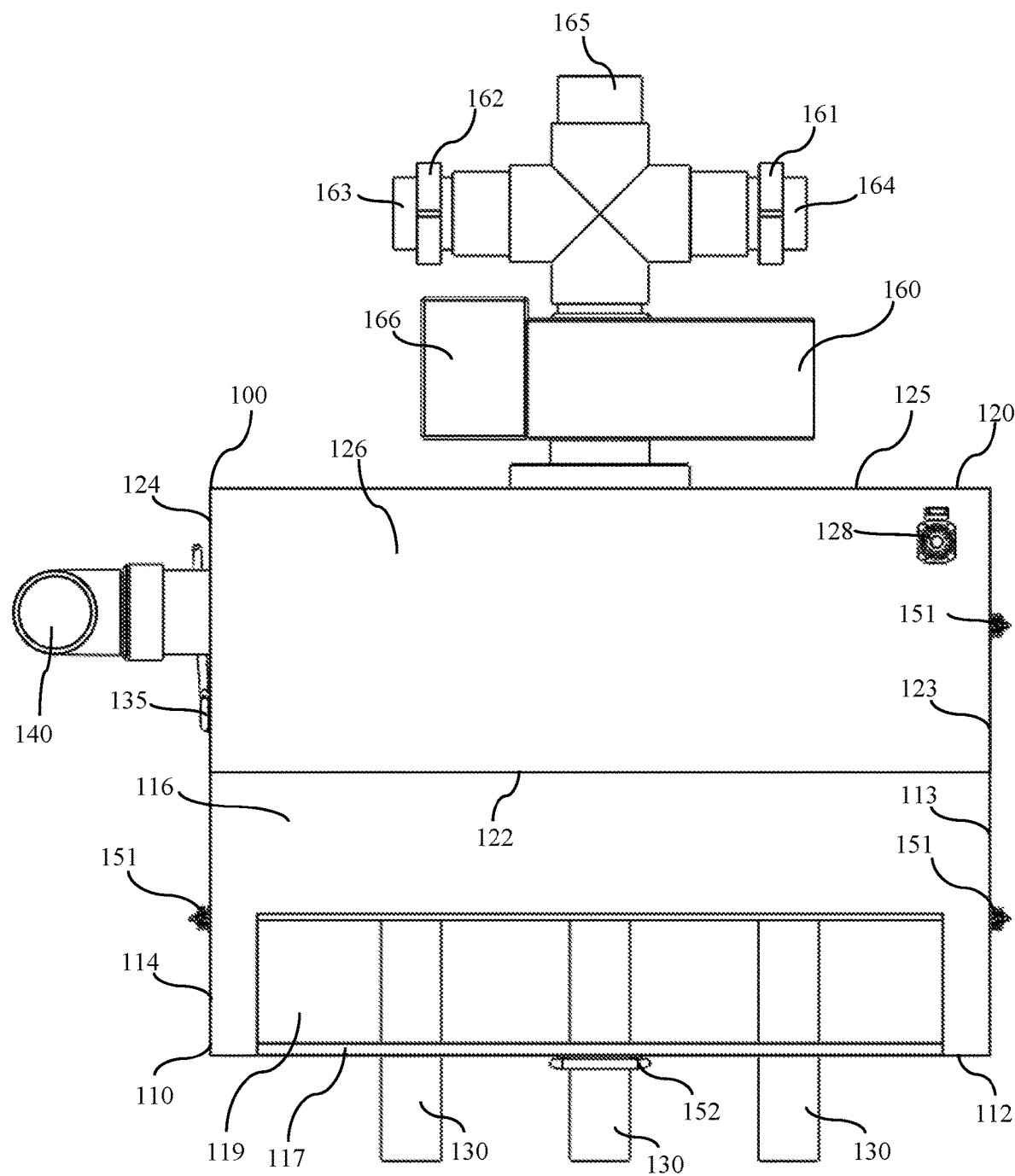
FIG. 8 is a bottom view of an apparatus of FIG. 1.
Figure 9:
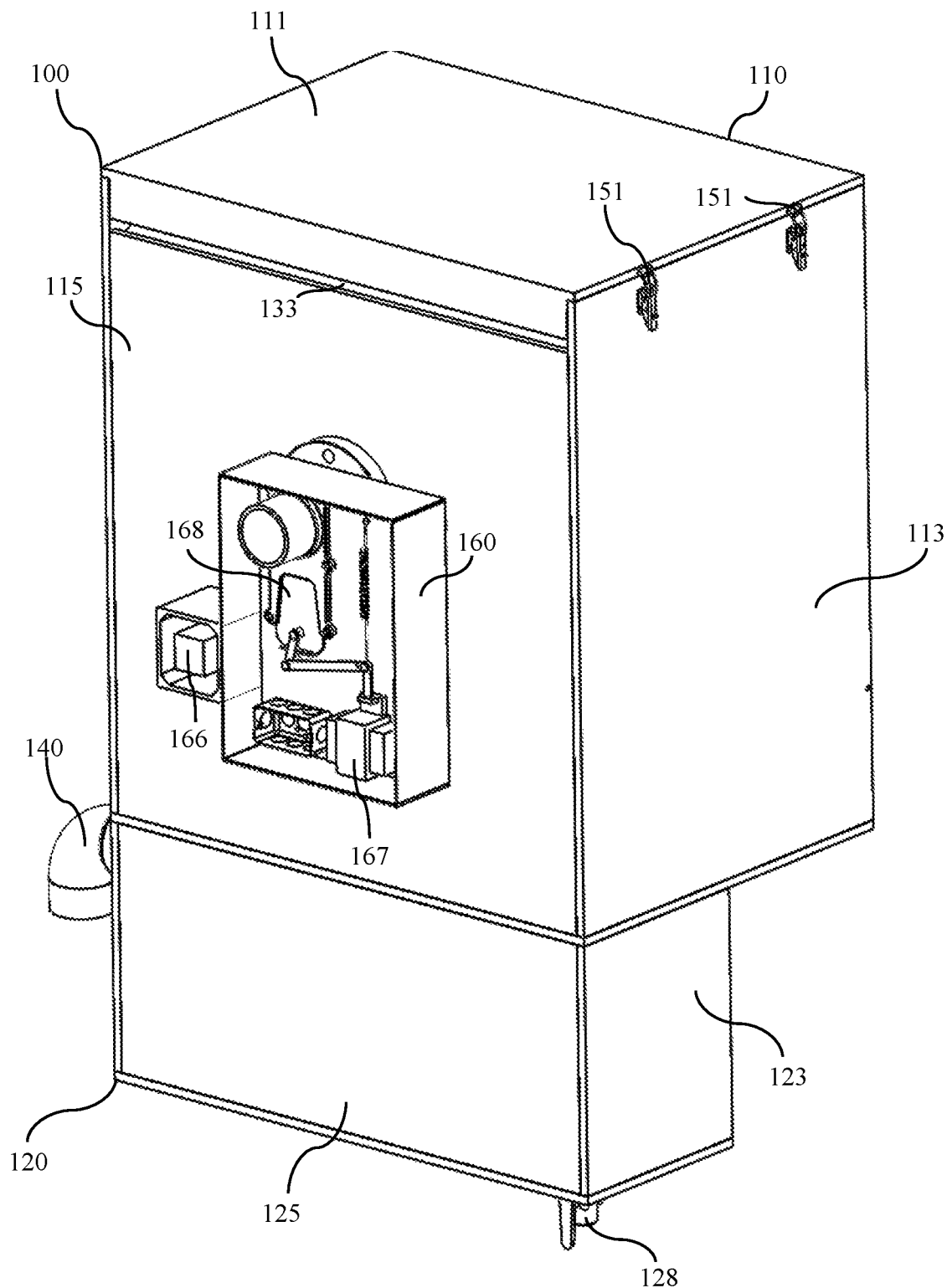
FIG. 9 is a rear perspective view of an apparatus of FIG. 1 showing the interior of a knife gate module.
Figure 10:
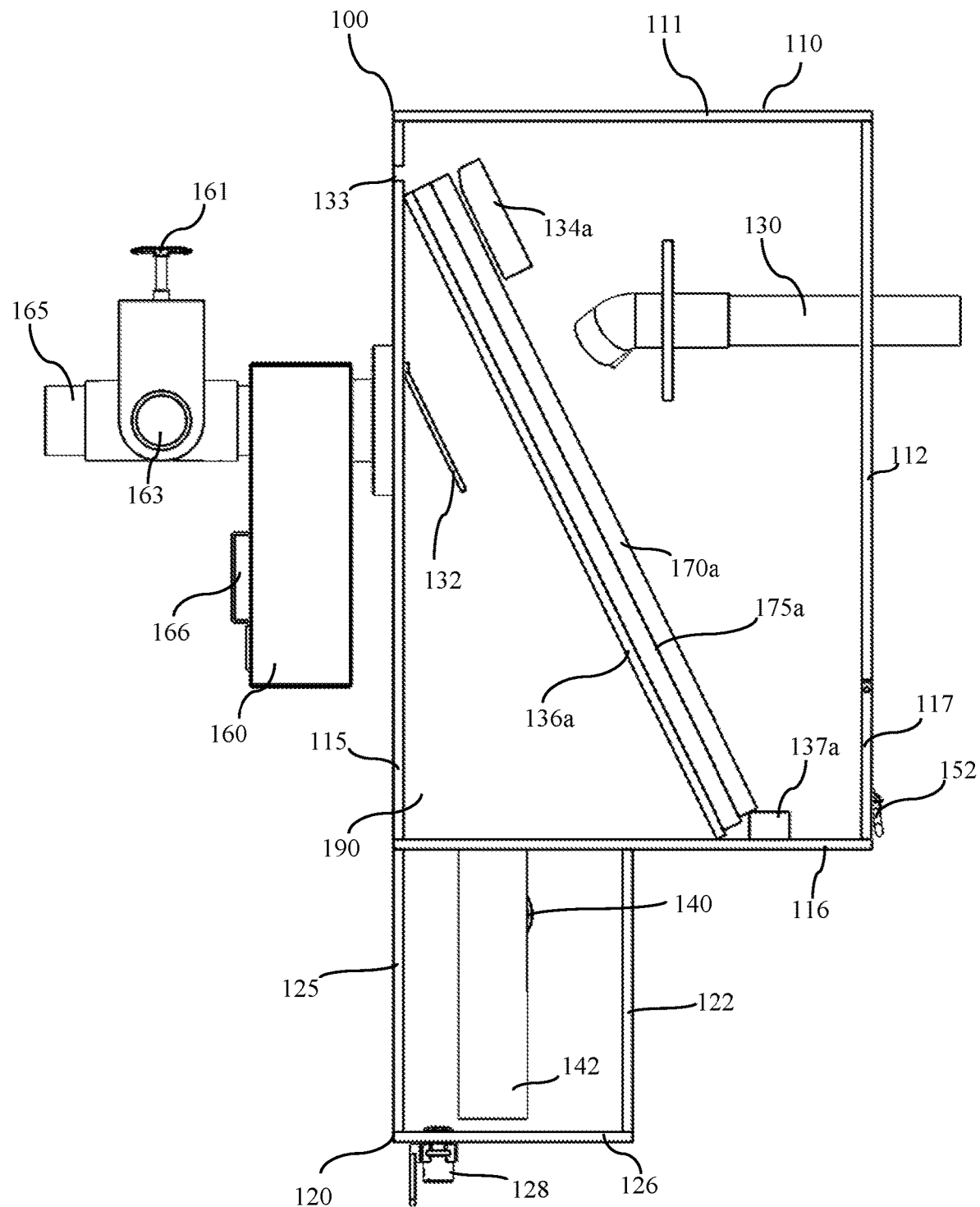
FIG. 10 is a left side view of an apparatus of FIG. 1 with the left side panel removed to show the interior of the apparatus.
Figure 11:
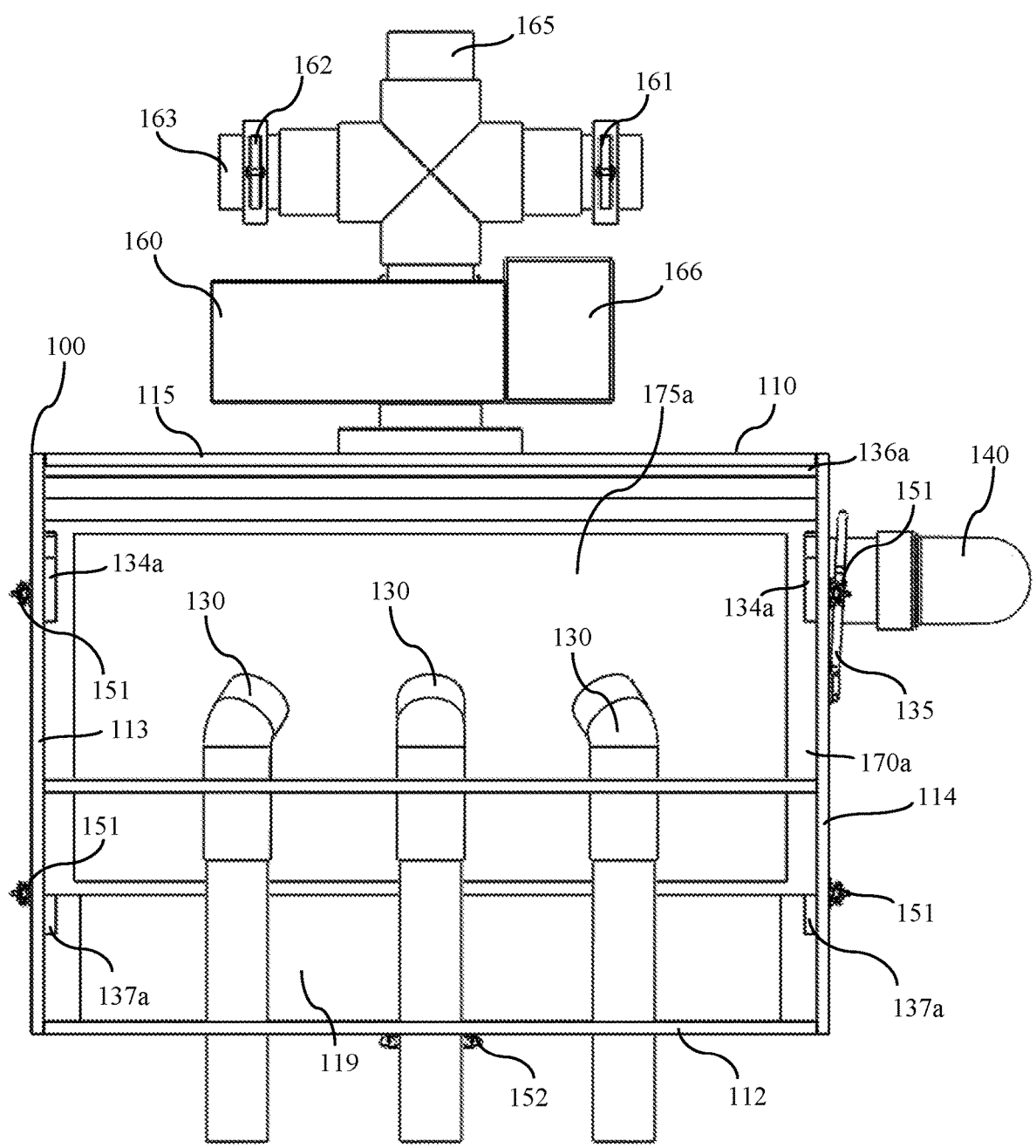
FIG. 11 is a top view of an apparatus of FIG. 1 with the top panel removed to illustrate the interior of the apparatus.
Figure 12:
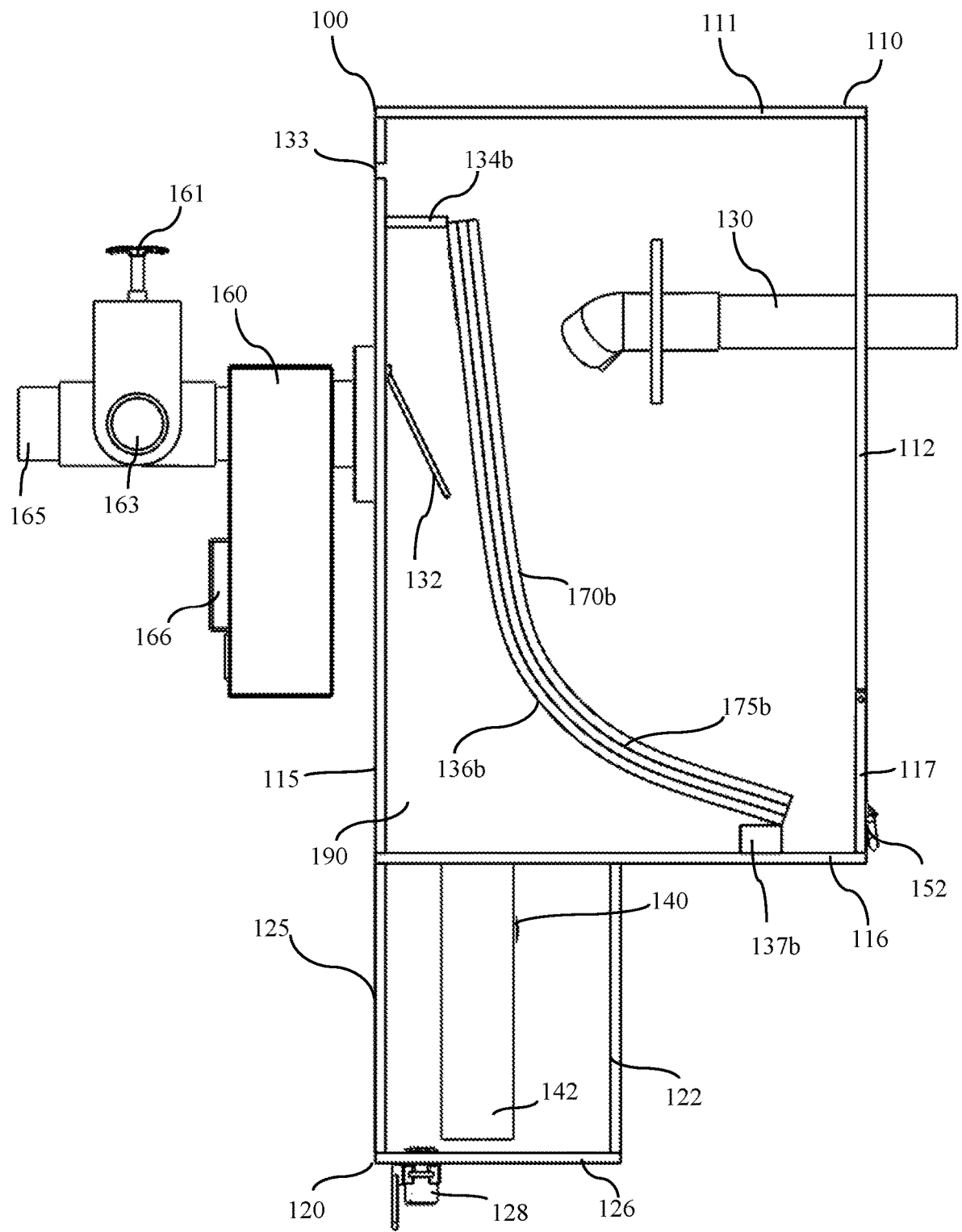
FIG. 12 is a left side view of an apparatus of FIG. 1 using a curved filter with the left side panel removed in order to display the interior of the apparatus.
Figure 13:
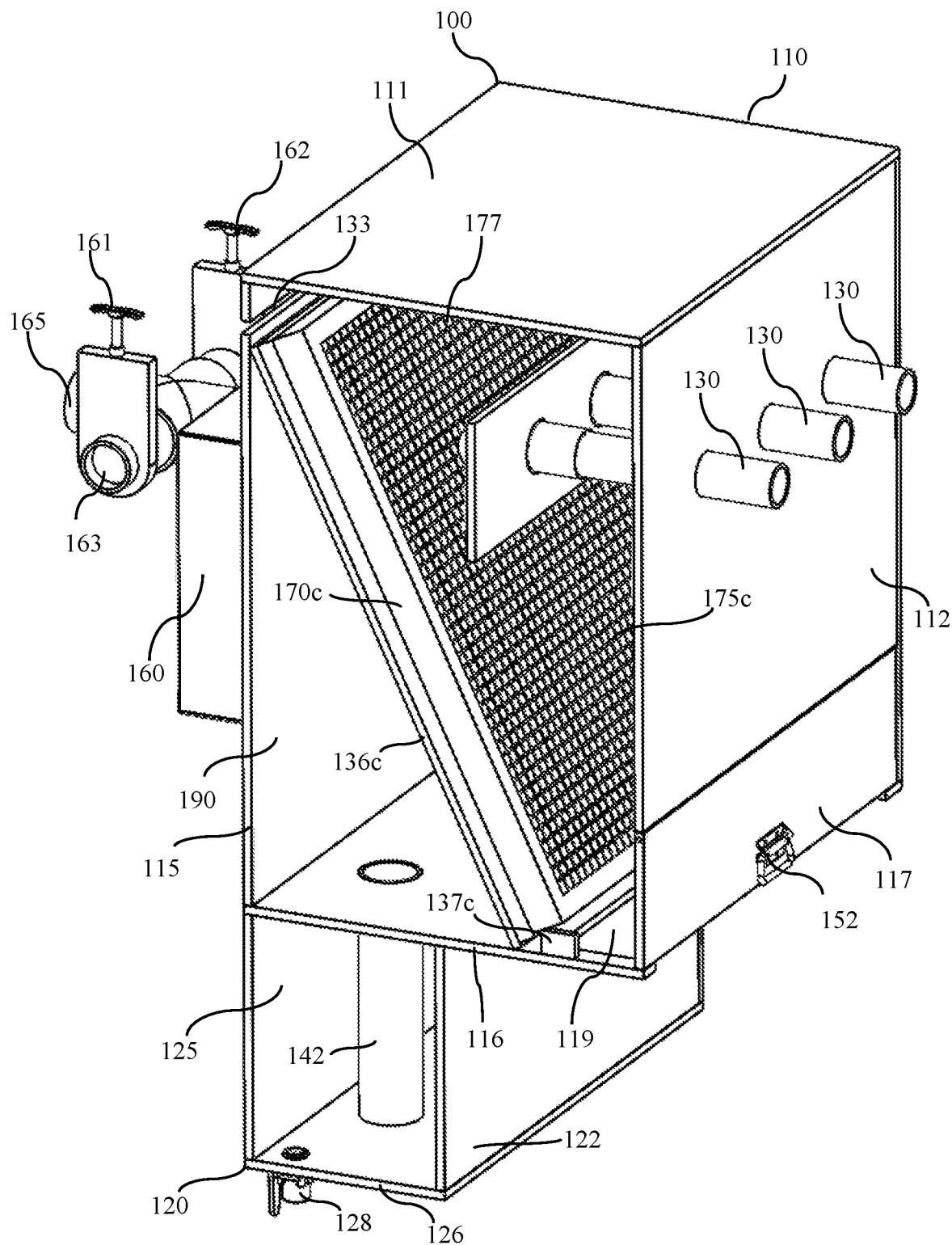
FIG. 13 is a left side perspective view of an apparatus of FIG. 1 using a reinforced filter with the left side panel removed in order to exhibit the interior of the apparatus.
Figure 14:
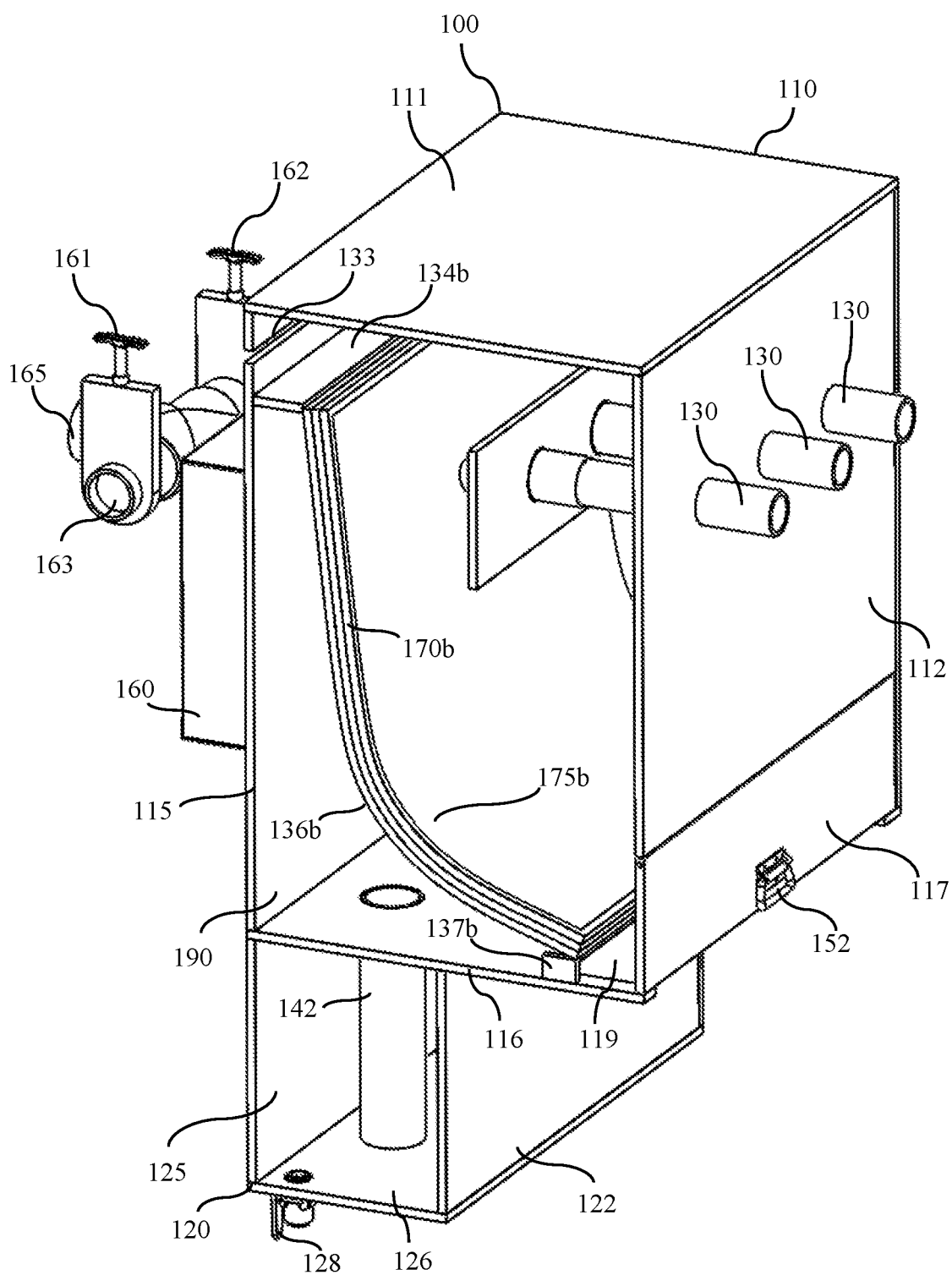
FIG. 14 is a left side perspective view of an apparatus of FIG. 1 using a curved filter with the left side panel removed in order to exhibit the interior of the apparatus.

Referring now to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, a Negative Pressure Filtration Apparatus 100 is shown. FIG. 1 illustrates a front perspective view of a Negative Pressure Filtration Apparatus 100. FIG. 2 depicts a rear perspective view of an apparatus of a Negative Pressure Filtration Apparatus 100. FIG. 3 shows a front view of an apparatus of a Negative Pressure Filtration Apparatus 100. FIG. 4 displays a rear view of an apparatus of a Negative Pressure Filtration Apparatus 100. FIG. 5 shows a right side view of an apparatus of a Negative Pressure Filtration Apparatus 100 with the fluid pump 310, vacuum pump 320, and receptacle 330. FIG. 6 depicts a left side view of an apparatus of a Negative Pressure Filtration Apparatus 100. FIG. 7 illustrates a top view of an apparatus of a Negative Pressure Filtration Apparatus 100. FIG. 8 demonstrates a bottom view of an apparatus of a Negative Pressure Filtration Apparatus 100. FIG. 9 shows a rear perspective view of a Negative Pressure Filtration Apparatus 100 showing the interior of a knife gate module 160. FIG. 10 displays a left side view of a Negative Pressure Filtration Apparatus 100 with the left side panel 113 removed to show the interior of the apparatus. FIG. 11 depicts a top view of a Negative Pressure Filtration Apparatus 100 with the top panel 111 removed to illustrate the interior of the apparatus. FIG. 12 shows a left side view of a Negative Pressure Filtration Apparatus 100 using a curved filter 170b with the left side panel 113 removed in order to display the interior of the apparatus. FIG. 13 illustrates a left side perspective view of a Negative Pressure Filtration Apparatus 100 using a reinforced filter frame 170c with the left side panel 113 removed in order to exhibit the interior of the apparatus. FIG. 14 depicts a left side perspective view of a Negative Pressure Filtration Apparatus 100 using a curved filter 170b with the left side panel 113 removed in order to exhibit the interior of the apparatus.

Referring still to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, a Negative Pressure Filtration Apparatus 100 comprises an upper chamber 110 for receiving unfiltered fluid, which attaches to a fluid pump 310; an automated knife gate module 160, which depends from the upper chamber 110 and attaches to a vacuum pump 320; and a lower chamber 120 for receiving filtered fluid, which attaches to the upper chamber 110. The upper chamber 110 comprises a front panel 112, a rear panel 115, a right side panel 114, a left side panel 113, a top panel 111, and a bottom panel 116, which combine to form an enclosed box-like structure. The front panel 112 comprises one or more inlet pipes 130, which connect to a fluid pump 310 for delivering unfiltered fluid to the apparatus; and a clean out access door 117 with a handle 152 for cleaning any buildup of contaminant within the upper chamber 110. The rear panel 115 comprises an upper vent 133 for exposing a portion of the interior of the upper chamber 110 to atmospheric pressure and a baffled vent hole 132, which attaches to the automated knife gate module 160. The right side panel 114 comprises a pressure meter 135, which measures and indicates pressure differentials within the upper chamber 110, and upper latches 151 for securing the top panel 111 to the right side panel 114. The left side panel 113 comprises upper latches 151 for securing the top panel 111 to the left side panel 113. The bottom panel 116 comprises a clean out opening 119, which allows filtered contaminant to be directed into a receptacle 330 for disposal. The upper chamber 110 further comprises a frame 170a 170b 170c disposed within the upper chamber 110 with a screen 175a 175b 175c comprising small holes that is attached to the frame 170a 170b 170c with seals 134a 134b 134c 136a 136b 136c 137a 137b 137c around and under the screen 175a 175b 175c to prevent air and liquid from moving around the side of the frame 170a 170b 170c. The frame 170a 170b 170c may be set at an angle anywhere from 45 degrees to 90 degrees (ideally around 60-63 degrees), but may also be positioned horizontally. The screen 175a 175b 175c comprises stainless steel, nylon, polyester, composite, cloth, silk, or other like material, and may or may not be stretched over the frame 170a 170b 170c. The hole size in the screen 175a 175b 175c can vary from as low as 5 microns to as much as 1 centimeter, but in most cases the screen size will be under 250 microns. The automated knife gate module 160 depends from the baffled vent hole 132 of the rear panel 115 of the upper chamber 110 and comprises a knife gate assembly 168; a high-speed actuator 167, a timer switch 166, a vacuum pipe 165 that attached to a vacuum pump 320, a right side pipe 164 with a right slide gate 161, and a left side pipe 163 with a left slide gate 162, which are used to regulate air flow. The lower chamber 120 depends from the bottom panel 116 of the upper chamber 110 and comprises a lower front panel 122; a lower rear panel 125; a lower right side panel 124; a lower left side panel 123; a lower bottom panel 126; an upper chamber drain pipe 142, which depends from the bottom panel 116 of the upper chamber 110; a lower chamber drain pipe 140 for delivering filtered fluid, which depends from the lower right side panel 124; and a wheel assembly 128, which depends from the lower bottom panel 126 of the lower chamber 120 and which allows the apparatus to be easily moved. During operation, the fluid pump 310 passes contaminated liquid through the inlet pipes 130 and over the screen 175a 175b 175c. Before starting the vacuum pump 320, the contaminated liquid flows across the surface of the screen 175a 175b 175c, without penetrating it, due to its surface tension and the small size of the holes in the screen 175a 175b 175c. When the vacuum pump 320 starts, air is drawn through the automated knife gate module 160 and baffled vent 132 and removed from behind the sealed screen 175a 175b 175c in the upper chamber 110 to create negative air pressure behind the screen 175a 175b 175c in a negative pressure zone 190. This air negative pressure breaks or weakens the surface tension of the contaminated liquid being treated and allows the liquid to easily pass through the screen 175a 175b 175c leaving any material larger than the screen openings on the surface of the screen 175a 175b 175c. As solids build up on the screen 175a 175b 175c, a purging cycle is initiated in which the negative air pressure is rapidly released using the automated knife gate module 160, creating a hammer-like effect that allows liquid to run down the face of the screen 175a 175b 175c, thereby washing the collected solids on the surface of the screen 175a 175b 175c off of the screen 175a 175b 175c, through the clean out opening 119 and into a collection receptacle 330. The timer switch 166 controls the high-speed actuator 167, which in turn activates the knife gate assembly 168, and allowing this washing effect to be manually initiated with a switch or periodically activated using a timer. After the screen 175a 175b 175c is washed, the automated knife gate module 160 allows the negative pressure to increase and liquid again flows through the screen 175a 175b 175c. The liquid being treated is directed at the screen 175a 175b 175c in a stream or streams with a specific velocity and at a specific angle in order to prevent splashback and allow multiple streams to be directed onto one screen 175a 175b 175c, which gives a higher flow rate for more efficient fluid treatment. The more streams that are directed at the screen, the lower the negative air pressure that is required because more of the screen 175a 175b 175c is covered in liquid; however, too much liquid will block the screen 175a 175b 175c because the air flow is reduced too much, so air must always flow through the unused parts of the screen 175a 175b 175c in order to help the liquid pass through the screen 175a 175b 175c. All solid are collected in a collection receptacle 330 placed below the clean out opening 119, which may further comprise wheels for ease of movement. Filtered and cleaned fluid passes from the negative pressure zone 190 into the lower chamber 120 through the upper chamber drain pipe 142 and is collected from the lower chamber drain pipe 140.

In further detail, referring still to the most preferred embodiment of the invention in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, in FIG. 12, FIG. 13, and FIG. 14, a Negative Pressure Filtration Apparatus 100 is shown using alternate frames 170b 170c and alternate screens 175b 175c. FIGS. 12 and 14 depict a frame 170b with screen 175b, which are curved to better facilitate the removal of contaminants from the surface of the screen 175b when the negative pressure is reduced during a purging cycle. The curve of the frame 170b and screen 175b allow any solid contaminants, which build up on the surface of the screen 175b during the filtration process, to be pulled down the screen 175b by their own weight and be more easily removed from the screen 175b while being washed during a purging cycle. FIG. 13 illustrates an alternate frame 170c and alternate screen 175c, which is reinforced with a reinforcement grid 177 in order to support the screen 175c under heavier contaminants or higher fluid flows and prevent deformation of the screen 175c. A reinforcement grid 177 also allows for finer screens 175c to be used in application which would damage the screen 175c in absence of reinforcement. A reinforcement grid 177 may also be used with a curved frame 170b and curved screen 175b. These alternate filters allow for flexibility depending on the type of contaminant being removed from a fluid and its physical properties.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14, are as follows. The front panel 112, rear panel 115, right side panel 114, left side panel 113, top panel 111, and bottom panel 116, of the upper chamber 110 comprises plastic, PVC, vinyl, fiberglass, metal, steel, aluminum, metal alloy, wood, ceramic, composite material, soundproofing material, ultra-high-density industrial soundproofing and thermal insulation, rock wool, or the like. The fluid pump 310 comprises a standard liquid pump, fluid pump, water pump, sump pump, or the like. The knife gate assembly 168 of the automated knife gate module 160 comprises plastic, PVC, vinyl, metal, steel, aluminum, metal alloy, composite material, or the like. The high-speed actuator 167 of the automated knife gate module 160 comprises a standard high-speed actuator, fast-acting valve, slide gate, mini butterfly valve, any valve that creates a hammer effect (air-hammer converted to water-hammer), or the like. The timer switch 166 of the automated knife gate module 160 comprises a standard timer with an integrated switch, or the like. The vacuum pipe 165 of the automated knife gate module 160 comprises plastic, PVC, vinyl, metal, steel, aluminum, metal alloy, composite material, or the like. The right side pipe 164 and left side pipe 163 of the automated knife gate module 160 comprises plastic, PVC, vinyl, metal, steel, aluminum, metal alloy, composite material, or the like. The right slide gate 161 and left slide gate 162 of the automated knife gate module 160 comprises standard slide gates. The vacuum pump 320 comprises a standard vacuum pump, air compressor, fan, air pump, or the like. The inlet pipes 130 comprises plastic, PVC, vinyl, metal, steel, aluminum, metal alloy, composite material, or the like. The access door 117 comprises plastic, PVC, vinyl, fiberglass, metal, steel, aluminum, metal alloy, wood, ceramic, composite material, or the like. The handle 152 comprises plastic, PVC, vinyl, metal, steel, aluminum, metal alloy, composite material, or the like. The baffled vent hole 132 comprises an opening with a baffle door, which comprises plastic, PVC, vinyl, metal, steel, aluminum, metal alloy, composite material, or the like. The pressure meter 135 comprises fluid-filled tubing, which connects to the negative pressure zone 190 and to atmospheric pressure, and comprises plastic, PVC, vinyl, metal, steel, glass, aluminum, metal alloy, composite material, or the like. The upper latches 151 comprises plastic, PVC, vinyl, metal, steel, aluminum, metal alloy, composite material, or the like. The frames 170a 170b 170c comprise plastic, PVC, vinyl, fiberglass, metal, steel, aluminum, metal alloy, wood, ceramic, composite material, or the like. The screens 175a 175b 175c may be flat or slightly curved and comprise small holes, which vary in size from as low as 5 microns to as much as 1 centimeter, but in most cases the screen size will be under 250 microns, and comprise stainless steel, nylon, polyester, composite, cloth, silk, plastic, polyethylene, polypropylene, nylon, Dacron, aluminum, hybrid metals, or whatever metal is compatible with the liquid being treated, or other like material, and may or may not be stretched over the frame 170a 170b 170c. Some of the plastic screen material may be treated to enhance their performance, such as with anti-stick coatings, UV protection, and/or plasma treatment on the screen surface to make it hydrophilic (Saati HR treated material). The size of the open surface area of the screen 175a 175b 175c is relevant to the amount of vacuum being used and the micron rating or hole size in the screen 175a 175b 175c. For example, to achieve the required negative pressure in inches of water, a screen 175a 175b 175c with larger holes of 70 microns will need more vacuum than a screen with a hole size of 45 microns. A reinforcement grid 177 or backer may also be used behind the screen 175a 175b 175c to prevent sagging, bowing and tearing and may also be used on screens 175a 175b 175c in high vacuum and may comprise a grid-type frame with large evenly spaced holes, which will support the screen evenly and allow liquid to pass unobstructed. These backers should also be compatible with the liquid being treated and smooth or polished to prevent damage to the underside of the screen 175a 175b 175c. The seals 134a 134b 134c 136a 136b 136c 137a 137b 137c comprise and air-tight and water-tight material, such as plastic, PVC, vinyl, fiberglass, rubber, metal, steel, aluminum, metal alloy, ceramic, composite material, or the like. The lower front panel 122, lower rear panel 125, lower right side panel 124, lower left side panel 123, and lower bottom panel 126, of the lower chamber 120 comprise plastic, PVC, vinyl, fiberglass, metal, steel, aluminum, metal alloy, wood, ceramic, composite material, soundproofing material, ultra-high-density industrial soundproofing and thermal insulation, rock wool, or the like. The drain pipe 142 comprises plastic, PVC, vinyl, metal, steel, aluminum, metal alloy, composite material, or the like. The lower chamber drain pipe 140 comprises plastic, PVC, vinyl, metal, steel, aluminum, metal alloy, composite material, or the like. The wheel assembly 128 comprises a standard wheel with an attachment bracket and comprises plastic, metal, steel, aluminum, metal alloy, composite material, or the like. The materials listed herein are examples only and not intended to limit the scope of the present invention.

Figure 15:
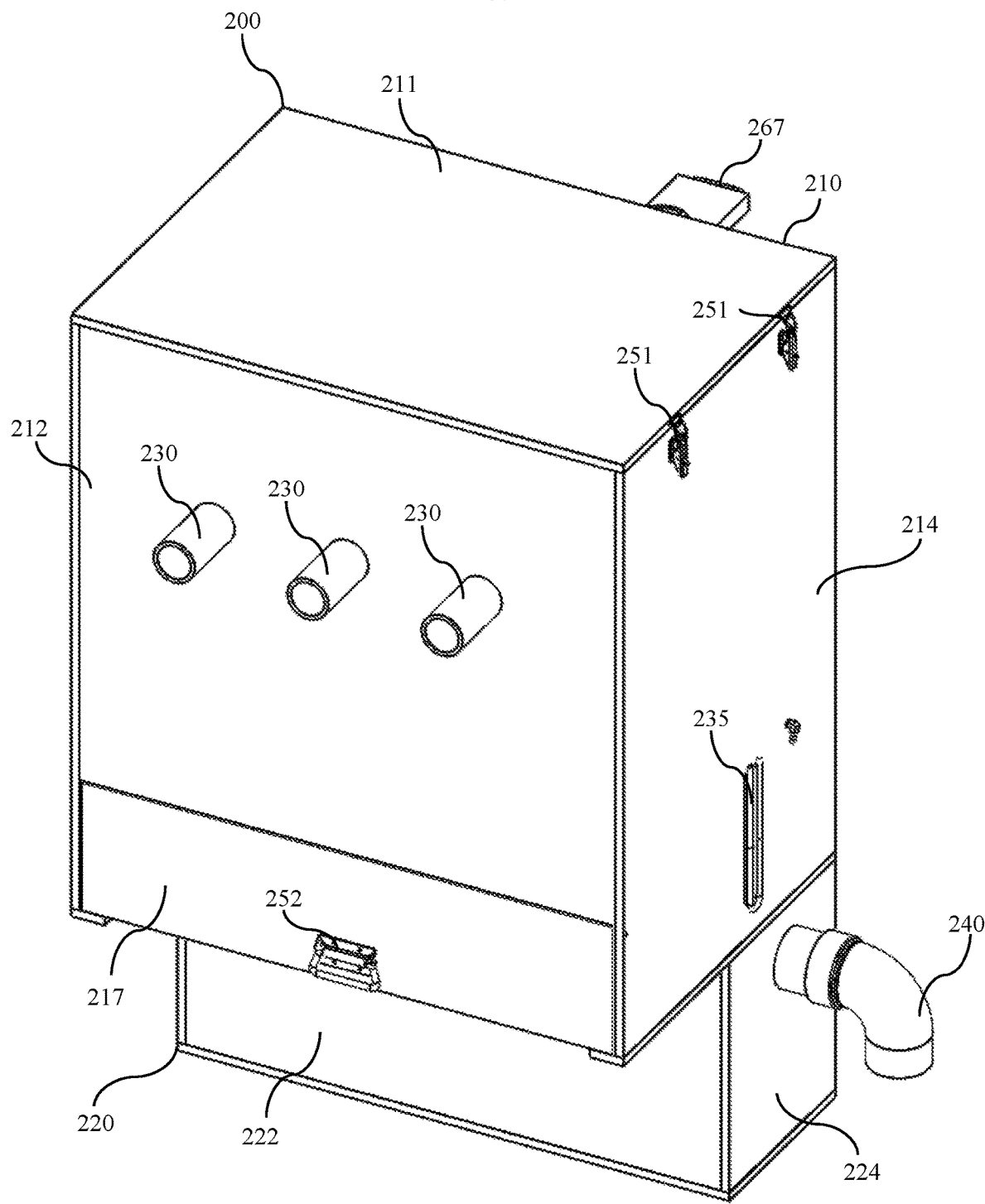
FIG. 15 is a front perspective view of another preferred embodiment of an apparatus of the present invention.
Figure 16:
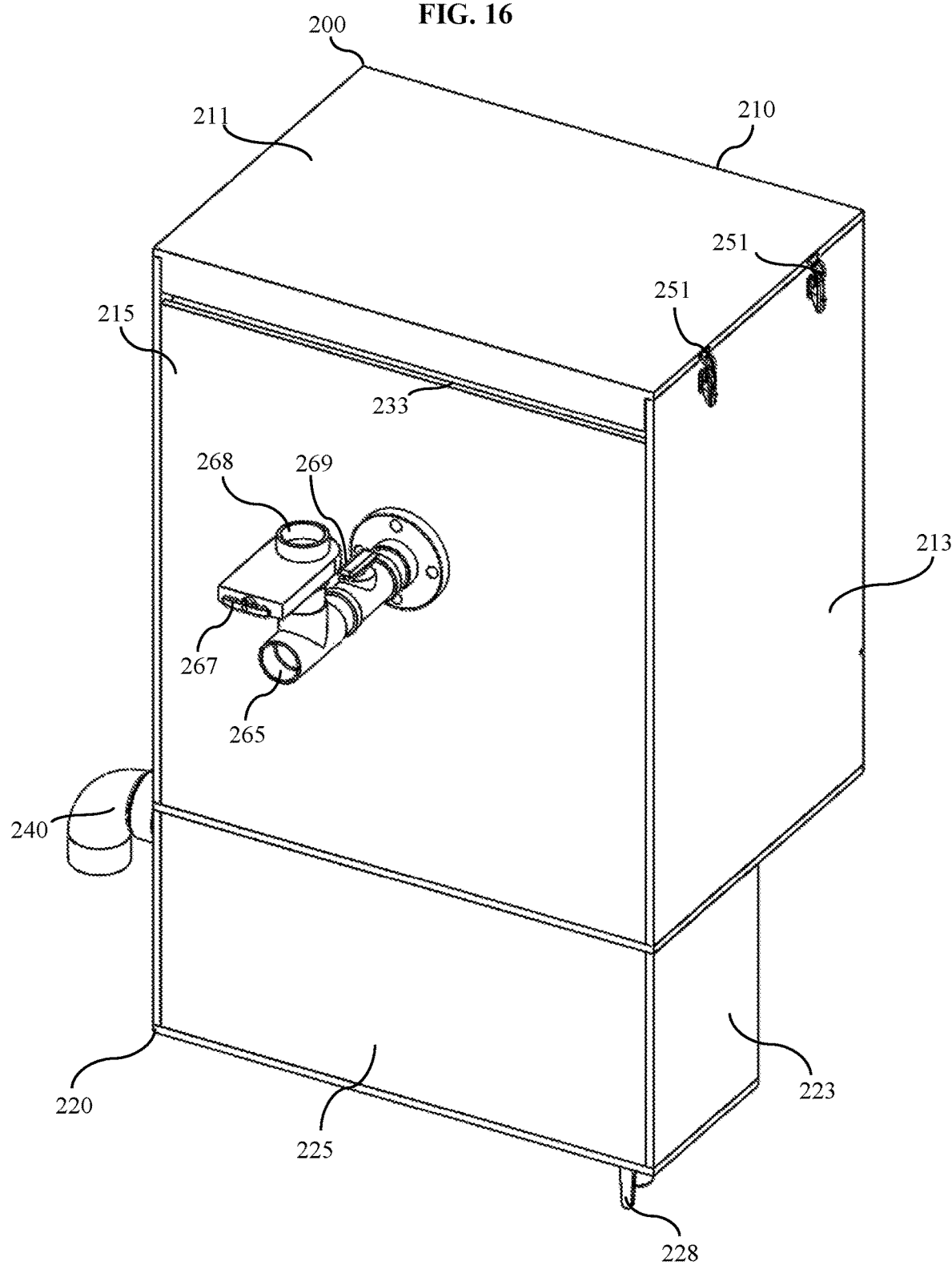
FIG. 16 is a rear perspective view of an apparatus of FIG. 15.
Figure 17:
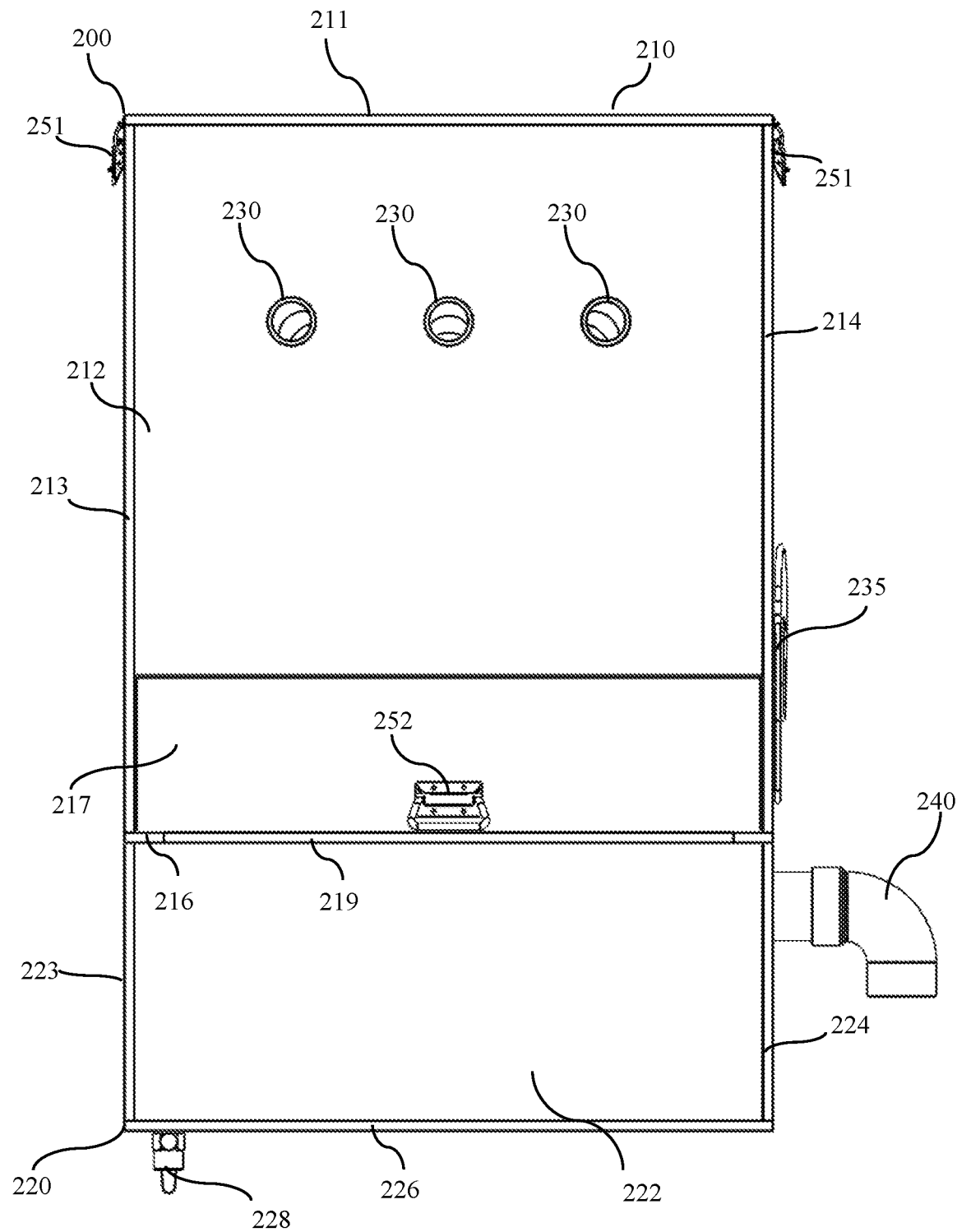
FIG. 17 is a front view of an apparatus of FIG. 15.
Figure 18:
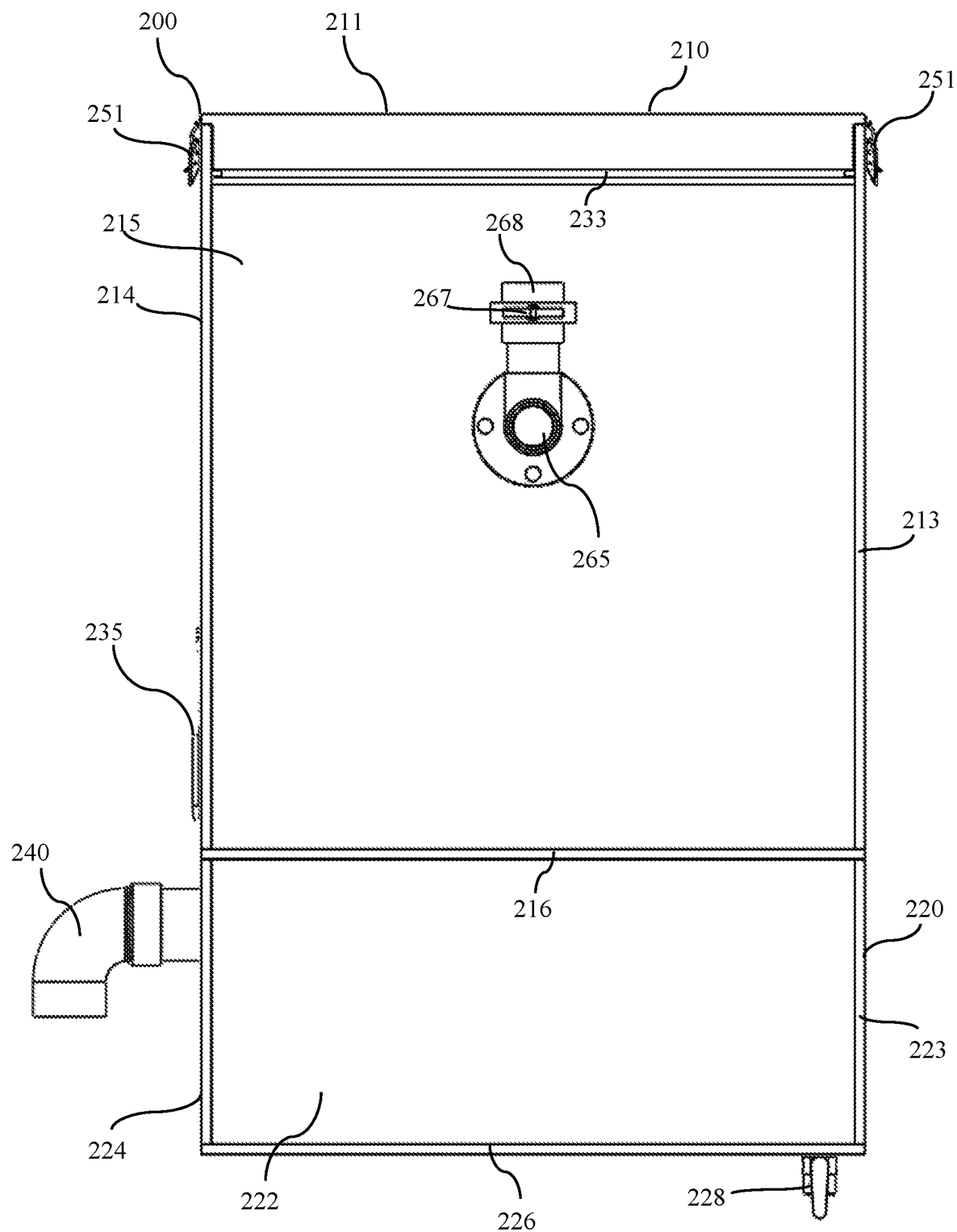
FIG. 18 is a rear view of an apparatus of FIG. 15.
Figure 19:
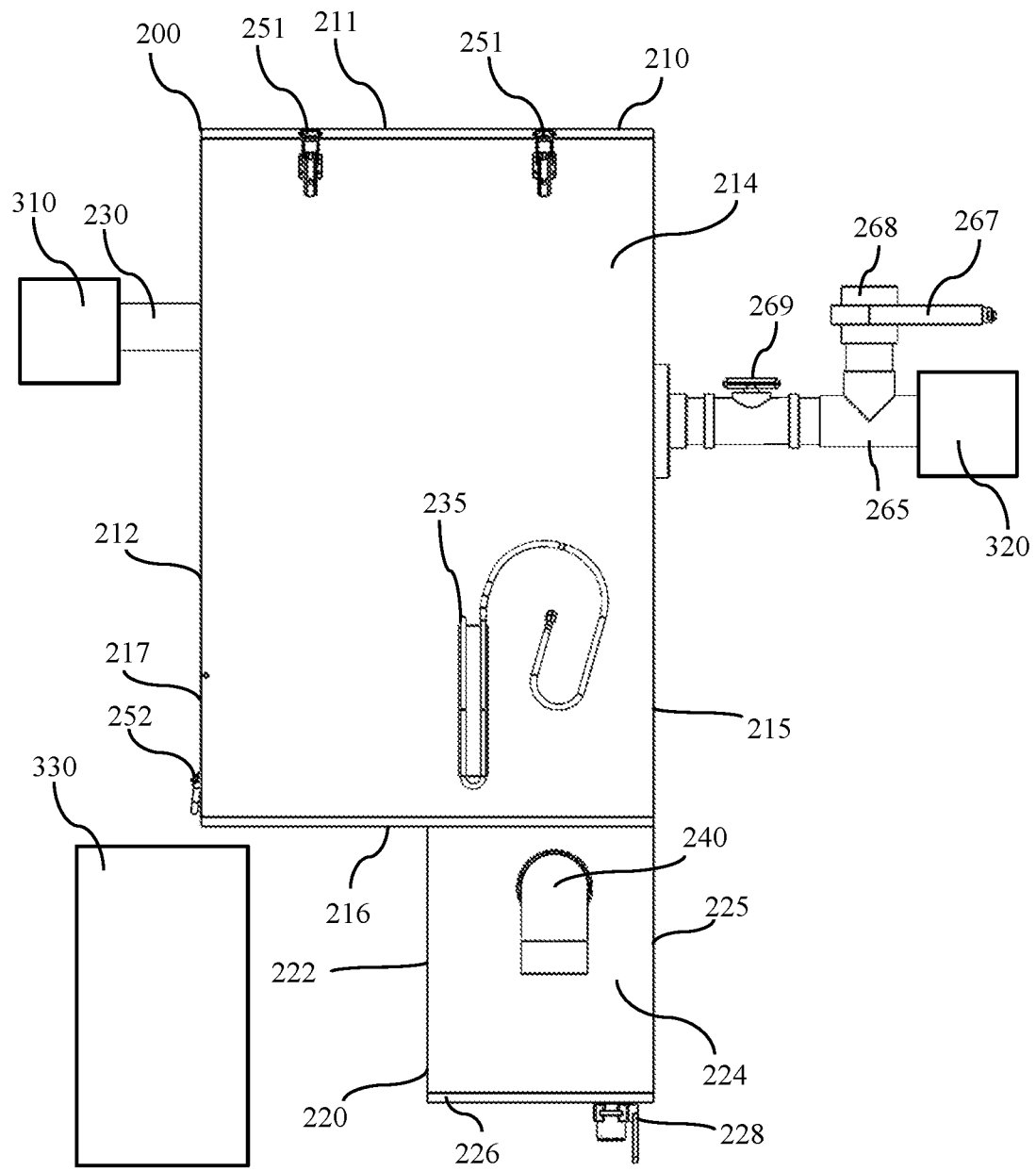
FIG. 19 is a right side view of an apparatus of FIG. 15 arranged with the fluid pump 310, vacuum pump 320, and receptacle 330.
Figure 20:
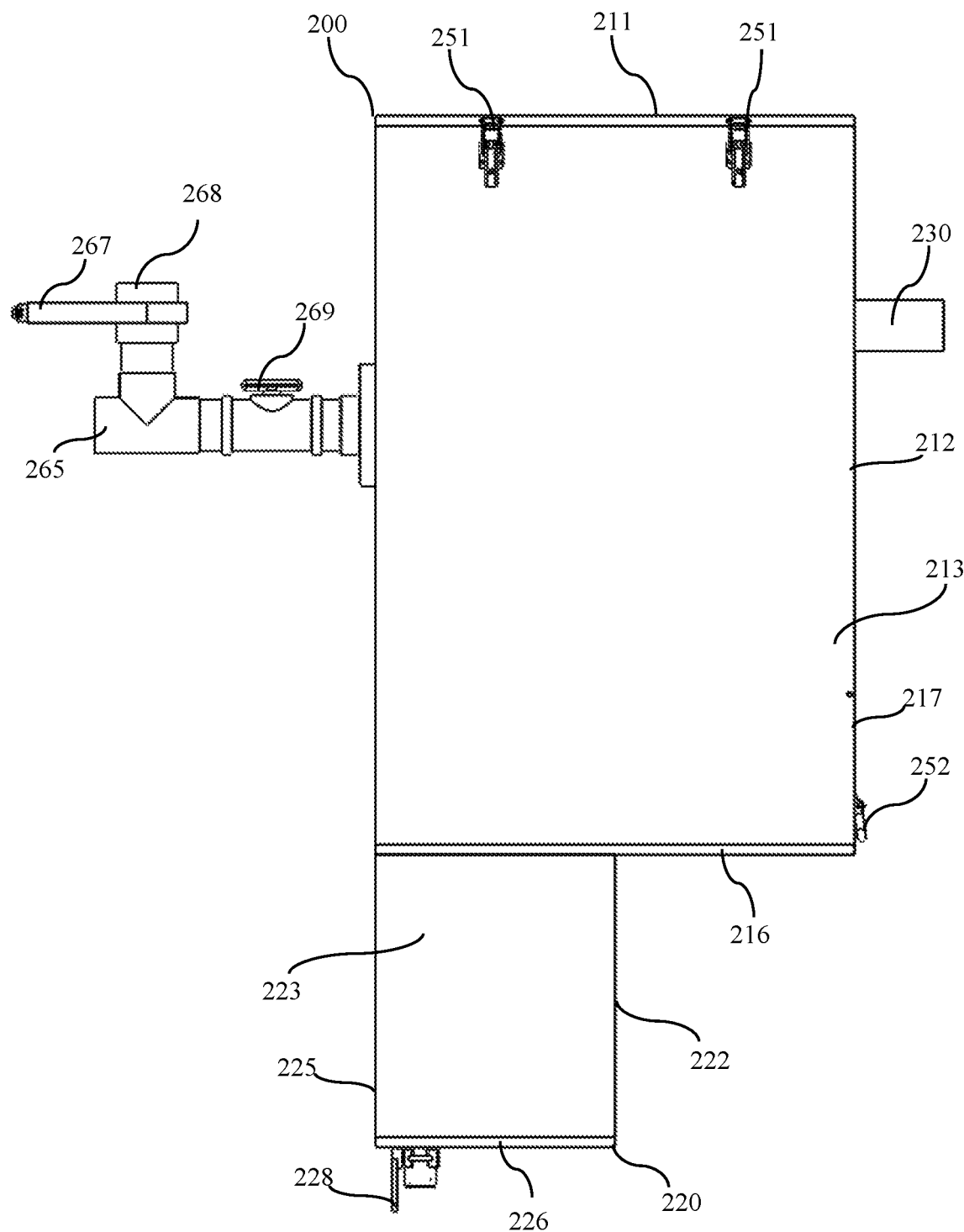
FIG. 20 is a left side view of an apparatus of FIG. 15.
Figure 21:
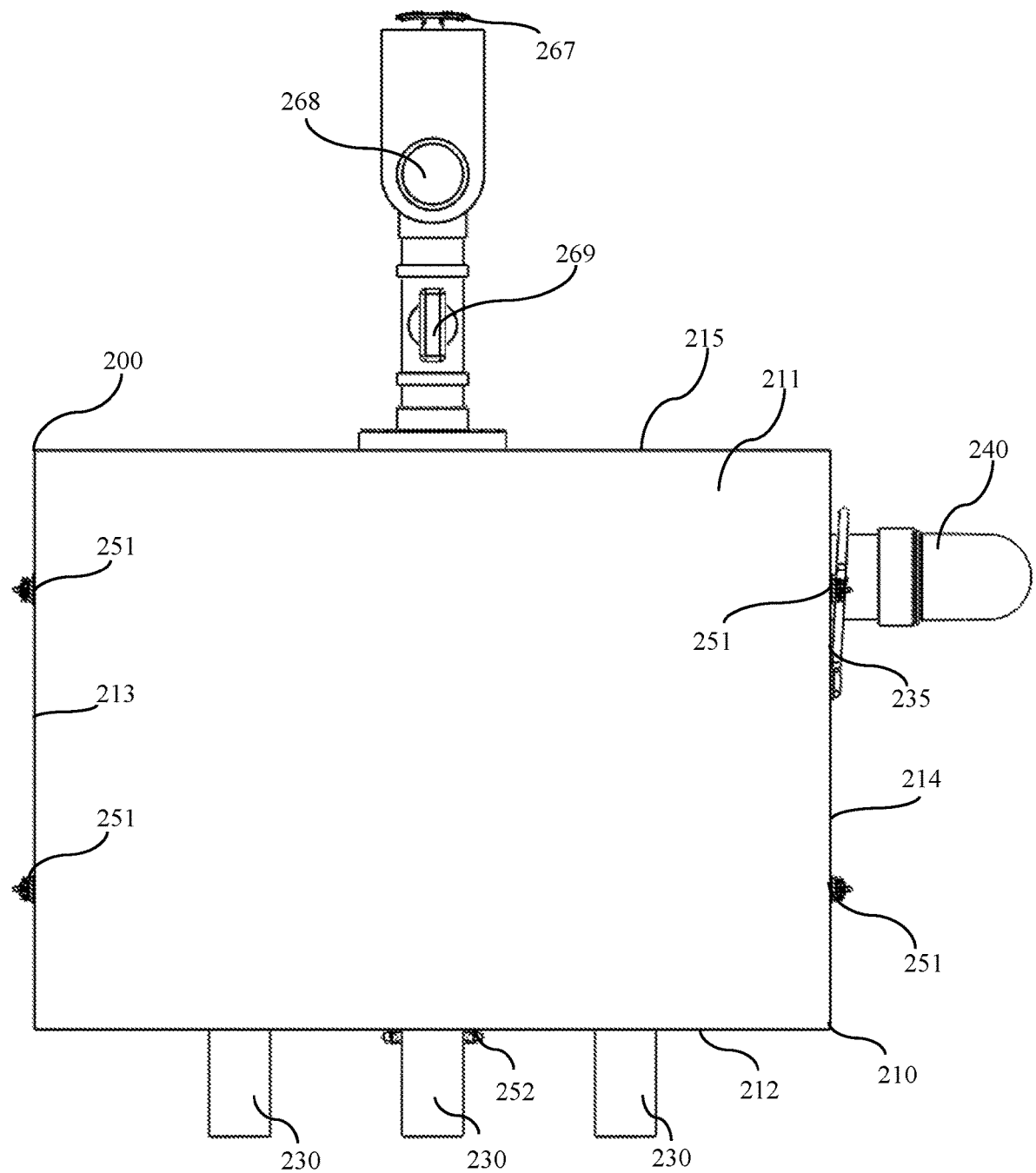
FIG. 21 is a top view of an apparatus of FIG. 15.
Figure 22:
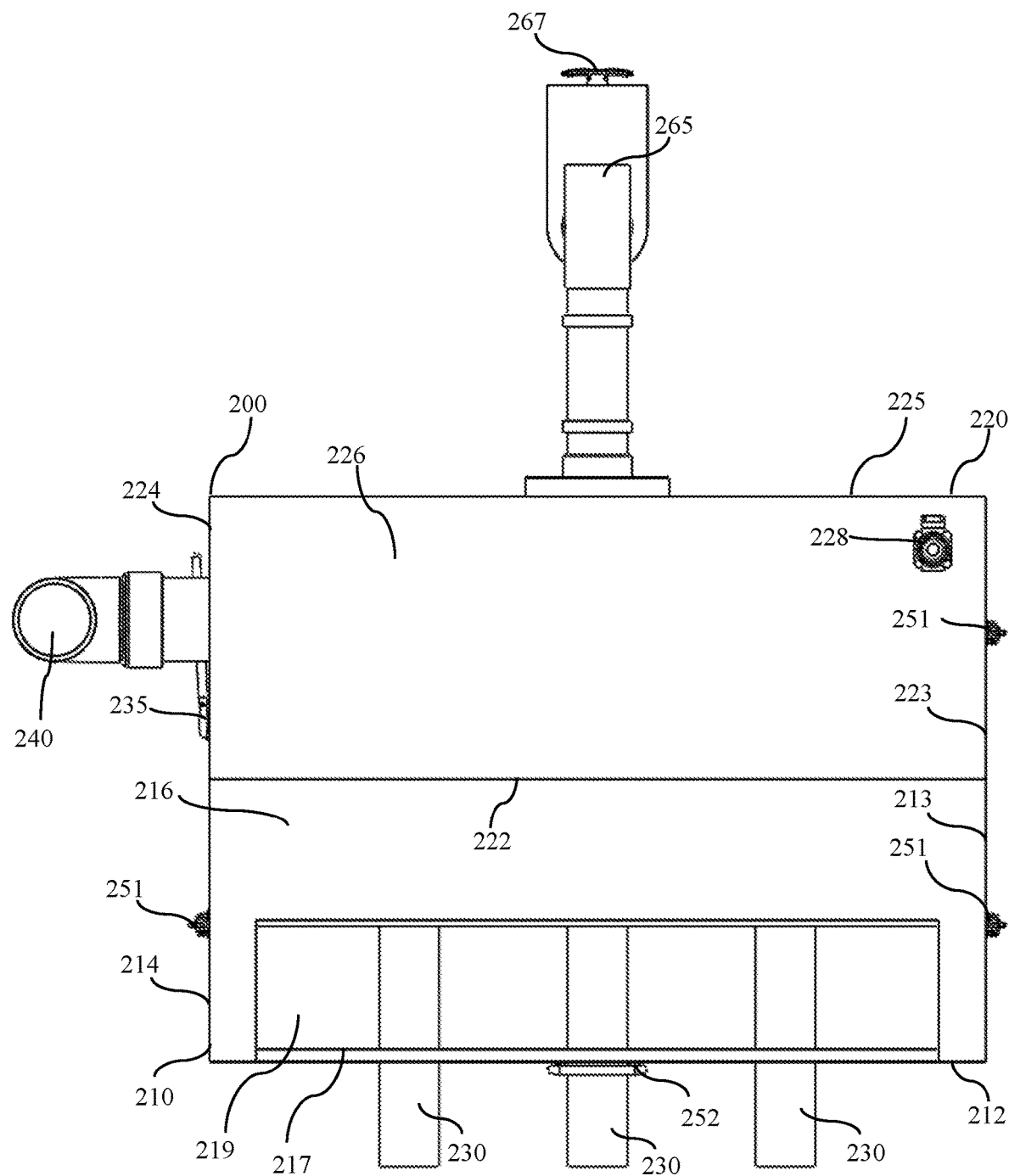
FIG. 22 is a bottom view of an apparatus of FIG. 15.
Figure 23:
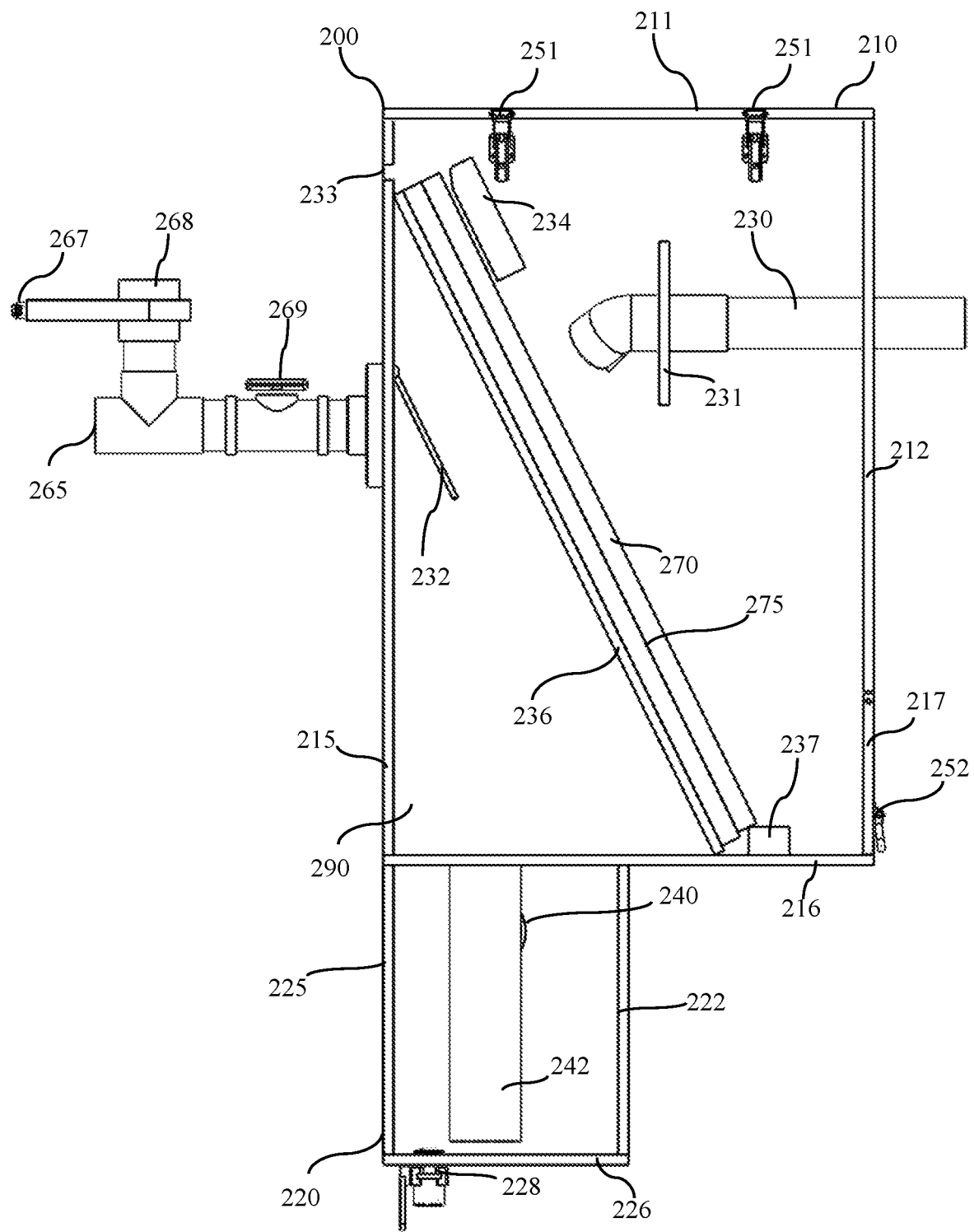
FIG. 23 is a left side view of an apparatus of FIG. 15 with the left side panel removed to show the interior of the apparatus.
Figure 24:
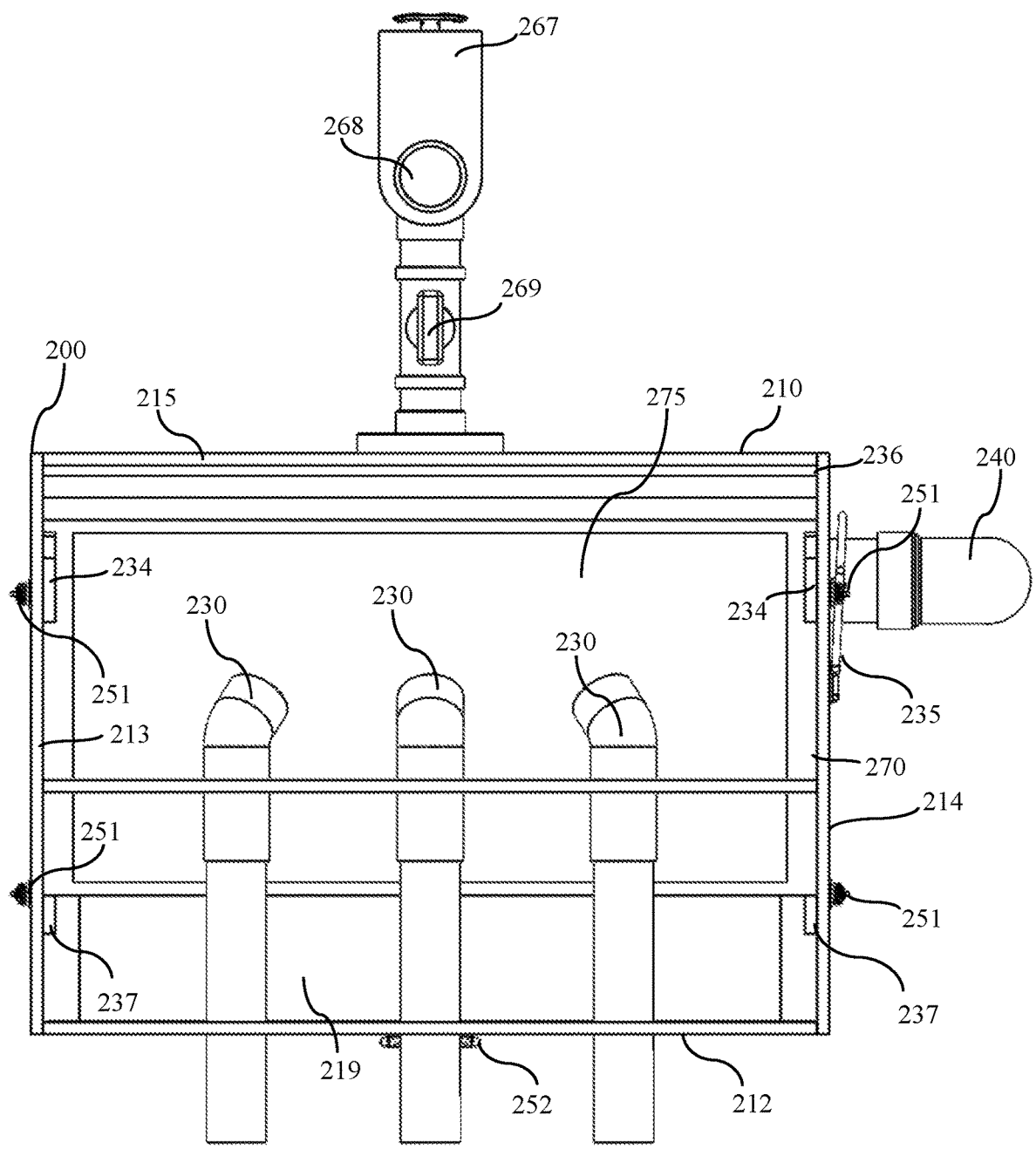
FIG. 24 is a top view of an apparatus of FIG. 15 with the top panel removed to illustrate the interior of the apparatus.

Referring now to another preferred embodiment of the present invention, in FIG. 15, FIG. 16, FIG. 17, FIG. 18, FIG. 19, FIG. 20, FIG. 21, FIG. 22, FIG. 23, and FIG. 24, a Manual Negative Pressure Filtration Apparatus 200 is shown. FIG. 15 illustrates a front perspective view of a Manual Negative Pressure Filtration Apparatus 200. FIG. 16 depicts a rear perspective view of a Manual Negative Pressure Filtration Apparatus 200. FIG. 17 displays a front view of a Manual Negative Pressure Filtration Apparatus 200. FIG. 18 shows a rear view of a Manual Negative Pressure Filtration Apparatus 200. FIG. 19 demonstrates a right side view of a Manual Negative Pressure Filtration Apparatus 200 with the fluid pump 310, vacuum pump 320, and receptacle 330. FIG. 20 exhibits a left side view of a Manual Negative Pressure Filtration Apparatus 200. FIG. 21 illustrates a top view of a Manual Negative Pressure Filtration Apparatus 200. FIG. 22 shows a bottom view of a Manual Negative Pressure Filtration Apparatus 200. FIG. 23 depicts a left side view of a Manual Negative Pressure Filtration Apparatus 200 with the manual left side panel 213 removed to show the interior of the apparatus. FIG. 24 displays a top view of a Manual Negative Pressure Filtration Apparatus 200 with the manual top panel 211 removed to illustrate the interior of the apparatus.

Referring still to the preferred embodiment of the invention in FIG. 15, FIG. 16, FIG. 17, FIG. 18, FIG. 19, FIG. 20, FIG. 21, FIG. 22, FIG. 23, and FIG. 24, a Manual Negative Pressure Filtration Apparatus 200 comprises a manual upper chamber 210 for receiving unfiltered fluid, which attaches to a fluid pump 310; a manual adjustment valve 269, which depends from the manual upper chamber 210 and attaches to a vacuum pump 320 through a manual vacuum pipe 265; vent pipe 268, which depends from the manual vacuum pipe 265; a manual slide gate 267, which depends from the vent pipe 268; and a manual lower chamber 220 for receiving filtered fluid, which attaches to the manual upper chamber 210. The manual upper chamber 210 comprises a manual front panel 212, a manual rear panel 215, a manual right side panel 1214, a manual left side panel 213, a manual top panel 211, and a manual bottom panel 216, which combine to form an enclosed box-like structure. The manual front panel 212 comprises one or more manual inlet pipes 230, which connect to a fluid pump 310 for delivering unfiltered fluid to the apparatus; and a manual clean out access door 217 with a manual handle 252 for cleaning any buildup of contaminant within the manual upper chamber 210. The manual rear panel 215 comprises a manual upper vent 233 for exposing a portion of the interior of the manual upper chamber 210 to atmospheric pressure and a manual baffled vent hole 232, which attaches to the manual adjustment valve 269. The manual right side panel 214 comprises a manual pressure meter 235, which measures and indicates pressure differentials within the manual upper chamber 210, and manual upper latches 251 for securing the manual top panel 211 to the manual right side panel 214. The manual left side panel 213 comprises manual upper latches 251 for securing the manual top panel 211 to the manual left side panel 213. The manual bottom panel 216 comprises a manual clean out opening 219, which allows filtered contaminant to be directed into a receptacle 330 for disposal. The manual upper chamber 210 further comprises a manual frame 270 disposed within the manual upper chamber 210 with a manual screen 275 comprising small holes that is attached to the manual frame 270 with manual seals 234 236 237 around and under the manual screen 275 to prevent air and liquid from moving around the side of the manual frame 270. The manual frame 270 may be set at an angle anywhere from 45 degrees to 90 degrees (ideally around 60-63 degrees), but may also be positioned horizontally. The manual screen 275 comprises stainless steel, nylon, polyester, composite, cloth, silk, or other like material, and may or may not be stretched over the manual frame 270. The hole size in the manual screen 275 can vary from as low as 5 microns to as much as 1 centimeter, but in most cases the screen size will be under 250 microns. (Accordingly, curved and reinforced frames and screens, as shown in FIGS. 12, 13, and 14 may also be used with the Manual Negative Pressure Filtration Apparatus 200.) The manual lower chamber 220 depends from the manual bottom panel 216 of the manual upper chamber 210 and comprises a manual lower front panel 222; a manual lower rear panel 225; a manual lower right side panel 224; a manual lower left side panel 223; a manual lower bottom panel 226; an manual upper chamber drain pipe 242, which depends from the manual bottom panel 216 of the manual upper chamber 210; a manual lower chamber drain pipe 240 for delivering filtered fluid, which depends from the manual lower right side panel 224; and a manual wheel assembly 228, which depends from the manual lower bottom panel 226 of the manual lower chamber 220 and which allows the apparatus to be easily moved. During operation, the fluid pump 310 passes contaminated liquid through the manual inlet pipes 230 and over the manual screen 275. Before starting the vacuum pump 320, the contaminated liquid flows across the surface of the manual screen 275, without penetrating it, due to its surface tension and the small size of the holes in the manual screen 275. When the vacuum pump 320 starts, air is drawn through the manual vacuum pipe 265 and manual baffled vent 232 and removed from behind the sealed screen 275 in the manual upper chamber 210 to create negative air pressure behind the manual screen 275 in a manual negative pressure zone 290. The manual adjustment valve 269 is used to adjust the negative air pressure. This air negative pressure breaks or weakens the surface tension of the contaminated liquid being treated and allows the liquid to easily pass through the manual screen 275 leaving any material larger than the screen openings on the surface of the screen 275. As solids build up on the manual screen 275, a manual purging cycle is initiated in which the negative air pressure is released using the manual slide gate 267, which depends from the vent pipe 268, creating a hammer-like effect that allows liquid to run down the face of the manual screen 275, thereby washing the collected solids on the surface of the manual screen 275 off of the manual screen 275, through the manual clean out opening 219 and into a collection receptacle 330. After the manual screen 275 is washed, the manual slide gate 267 is closed allowing the negative pressure to increase and liquid again flows through the manual screen 275. The liquid being treated is directed at the manual screen 275 in a stream or streams with a specific velocity and at a specific angle in order to prevent splash-back and allow multiple streams to be directed onto one manual screen 275, which gives a higher flow rate for more efficient fluid treatment. The more streams that are directed at the manual screen 275, the lower the negative air pressure that is required because more of the manual screen 275 is covered in liquid; however, too much liquid will block the manual screen 275 because the air flow is reduced too much, so air must always flow through the unused parts of the manual screen 275 in order to help the liquid pass through the manual screen 275. All solid are collected in a collection receptacle 330 placed below the manual clean out opening 219, which may further comprise wheels for ease of movement. Filtered and cleaned fluid passes from the manual negative pressure zone 290 into the manual lower chamber 220 through the manual upper chamber drain pipe 242 and is collected from the manual lower chamber drain pipe 240.

The construction details of the invention as shown in FIG. 15, FIG. 16, FIG. 17, FIG. 18, FIG. 19, FIG. 20, FIG. 21, FIG. 22, FIG. 23, and FIG. 24, are as follows. The manual front panel 212, manual rear panel 215, manual right side panel 214, manual left side panel 213, manual top panel 211, and manual bottom panel 216, of the manual upper chamber 210 comprises plastic, PVC, vinyl, fiberglass, metal, steel, aluminum, metal alloy, wood, ceramic, composite material, soundproofing material, ultra-high-density industrial soundproofing and thermal insulation, rock wool, or the like. The fluid pump 310 comprises a standard liquid pump, fluid pump, water pump, sump pump, or the like. The manual adjustment valve 269 comprises a standard valve and comprises plastic, PVC, vinyl, metal, steel, aluminum, metal alloy, composite material, or the like. The manual vacuum pipe 265 comprises plastic, PVC, vinyl, metal, steel, aluminum, metal alloy, composite material, or the like. The vent pipe 268 comprises plastic, PVC, vinyl, metal, steel, aluminum, metal alloy, composite material, or the like. The manual slide gate 267 comprises a standard slide gate, fast-acting valve, mini butterfly valve, any valve that creates a hammer effect (air-hammer converted to water-hammer), or the like. The vacuum pump 320 comprises a standard vacuum pump, air compressor, fan, air pump, or the like. The manual inlet pipes 230 comprises plastic, PVC, vinyl, metal, steel, aluminum, metal alloy, composite material, or the like. The manual access door 217 comprises plastic, PVC, vinyl, fiberglass, metal, steel, aluminum, metal alloy, wood, ceramic, composite material, or the like. The manual handle 252 comprises plastic, PVC, vinyl, metal, steel, aluminum, metal alloy, composite material, or the like. The manual baffled vent hole 232 comprises an opening with a baffle door, which comprises plastic, PVC, vinyl, metal, steel, aluminum, metal alloy, composite material, or the like. The manual pressure meter 235 comprises fluid-filled tubing, which connects to the manual negative pressure zone 290 and to atmospheric pressure, and comprises plastic, PVC, vinyl, metal, steel, glass, aluminum, metal alloy, composite material, or the like. The manual upper latches 251 comprises plastic, PVC, vinyl, metal, steel, aluminum, metal alloy, composite material, or the like. The manual frame 270 comprises plastic, PVC, vinyl, fiberglass, metal, steel, aluminum, metal alloy, wood, ceramic, composite material, or the like. The manual screen 275 may be flat or slightly curved and comprises small holes, which vary in size from as low as 5 microns to as much as 1 centimeter, but in most cases the screen size will be under 250 microns, and comprise stainless steel, nylon, polyester, composite, cloth, silk, plastic, polyethylene, polypropylene, nylon, Dacron, aluminum, hybrid metals, or whatever metal is compatible with the liquid being treated, or other like material, and may or may not be stretched over the manual frame 270. Some of the plastic screen material may be treated to enhance their performance, such as with anti-stick coatings, UV protection, and/or plasma treatment on the screen surface to make it hydrophilic (Saati HR treated material). The size of the open surface area of the manual screen 275 is relevant to the amount of vacuum being used and the micron rating or hole size in the manual screen 275. For example, to achieve the required negative pressure in inches of water, a manual screen 275 with larger holes of 70 microns will need more vacuum than a screen with a hole size of 45 microns. A reinforcement grid or backer may also be used behind the manual screen 275 to prevent sagging, bowing and tearing and may also be used on a manual screen 275 used in high vacuum and may comprise a grid-type frame with large evenly spaced holes, which will support the screen evenly and allow liquid to pass unobstructed. These backers should also be compatible with the liquid being treated and smooth or polished to prevent damage to the underside of the manual screen 275. The manual seals 134 136 137 comprise and air-tight and water-tight material, such as plastic, PVC, vinyl, fiberglass, rubber, metal, steel, aluminum, metal alloy, ceramic, composite material, or the like. The manual lower front panel 222, manual lower rear panel 225, manual lower right side panel 224, manual lower left side panel 223, and manual lower bottom panel 226, of the manual lower chamber 220 comprise plastic, PVC, vinyl, fiberglass, metal, steel, aluminum, metal alloy, wood, ceramic, composite material, soundproofing material, ultra-high-density industrial soundproofing and thermal insulation, rock wool, or the like. The manual drain pipe 242 comprises plastic, PVC, vinyl, metal, steel, aluminum, metal alloy, composite material, or the like. The manual lower chamber drain pipe 240 comprises plastic, PVC, vinyl, metal, steel, aluminum, metal alloy, composite material, or the like. The manual wheel assembly 228 comprises a standard wheel with an attachment bracket and comprises plastic, metal, steel, aluminum, metal alloy, composite material, or the like. The materials listed herein are examples only and not intended to limit the scope of the present invention.

The advantages of the present invention include, without limitation, that it provides a highly efficient means rapidly filtering contaminated fluids. Further, the present invention allows for fluids to be cleansed using relatively inexpensive screen filters, as opposed to expensive filters, which are required in the absence of negative air pressure. Moreover, the present invention allows for a large volume of contaminated liquid to be rapidly filtered and cleaned. Additionally, the present invention allows filters to be self-cleaned with minimal interruption to the filtering process. In sum, the Negative Pressure Filtration Invention provides convenient, efficient, and relatively inexpensive means for filtering contaminated liquid.

In broad embodiment, the present invention relates generally to a method, system, and apparatus, for filtering liquid, which uses negative air pressure to draw liquid stream through a filter screen and which cleans that filter screen by periodically modulating the negative air pressure to allow the liquid stream to wash any contaminated from the filter screen.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus for filtering contaminated liquid, said contaminated liquid comprising liquid and contaminants, said apparatus comprising:
   a box; said box comprising:
      a frame disposed within said box, said frame dividing said box into
      a negative air pressure region and an atmospheric air pressure region;
      a screen, said screen being sealably attached to said frame between said negative air pressure region and said atmospheric air pressure region in such a manner to prevent air and liquid from moving between said frame and said screen, said screen comprising:
         a surface, and
         holes;
      a vent hole, said vent hole being disposed in said negative air pressure region;
      a drain hole, said drain hole being disposed in said negative pressure region;
      one or more inlet pipes;
      a drain pipe, said drain pipe being connected to said drain hole; and
      a lower chamber, which receives said drain pipe, said lower chamber comprising:
         a chamber drain pipe; and
   a liquid pump, said liquid pump depending from said one or more inlet pipes;
   a vacuum pump said vacuum pump unit being connected to said vent hole;
   an air flow regulator, said air flow regulator being capable of modulating air flow through said vent hole; and
   a timer switch, said timer switch being capable of controlling said air flow regulator;
   a receptacle;
   whereby said liquid pump forces a liquid stream of said contaminated liquid through said one or more inlet pipes and onto said surface of said screen in said atmospheric air pressure region;
   whereby said vacuum pump unit removes air from said negative air pressure region thereby creating negative air pressure in said negative air pressure region;
   whereby said negative air pressure draws said liquid through said screen while depositing said contaminants on said surface of said screen,
   whereby said screen is washed of said contaminants by using said timer switch to control said air flow regulator to periodically modulate said negative air pressure to allow said liquid stream to wash said contaminants from said surface of said screen;
   whereby said contaminants are collected in said receptacle; and
   whereby uncontaminated said liquid is collected in said lower chamber and flows out of said chamber drain pipe.

2. An apparatus of claim 1, wherein said timer switch is operated manually.

3. An apparatus of claim 1, wherein said timer switch is operated automatically.

4. An apparatus of claim 1, wherein said air flow regulator further comprises a knife gate.

5. An apparatus of claim 1, wherein said vacuum pump further comprises a variable speed motor.

6. An apparatus of claim 1, wherein said box further comprises a sound-proof exterior.

7. A method for filtering contaminated liquid, said contaminated liquid comprising liquid and contaminants, said method comprising:
   providing a box; said box comprising:
      a frame disposed within said box, said frame dividing said box into a negative air pressure region and an atmospheric air pressure region;
      a screen, said screen being sealably attached to said frame between said negative air pressure region and said atmospheric air pressure region in such a manner to prevent air and liquid from moving between said frame and said screen, said screen comprising:
         a surface, and
         holes, said holes being smaller than said contaminants;
      a vent hole, said vent hole being disposed in said negative air pressure region;
      a drain hole, said drain hole being disposed in said negative pressure region;
      one or more inlet pipes;
      a drain pipe, said drain pipe being connected to said drain hole; and
      a lower chamber, which receives said drain pipe, said lower chamber comprising:
         a chamber drain pipe; and
   providing a liquid pump, said liquid pump depending from said one or more inlet pipes;
   providing a vacuum pump, said vacuum pump being connected to said vent hole;
   providing an air flow regulator, said air flow regulator being capable of modulating air flow through said vent hole;
   providing a receptacle;
   forcing a liquid stream of said contaminated liquid through said one or more inlet pipes and onto said surface of said screen in said atmospheric air pressure region using said liquid pump;
   removing air from said negative air pressure region, thereby creating negative air pressure in said negative air pressure region, using said vacuum pump;
   using said negative air pressure to draw said liquid through said screen while depositing said contaminants on said surface of said screen;
   washing said contaminants from said surface of screen by using said air flow regulator to periodically modulate said negative air pressure to allow said liquid stream to wash said contaminants from said surface of said screen;
   collecting said contaminants in said receptacle;

collecting uncontaminated said liquid in said lower chamber; and flowing uncontaminated said liquid out of said chamber drain pipe.

8. A method of claim 7, wherein said air flow regulator is operated manually.

9. A method of claim 7, wherein said air flow regulator is operated automatically.

10. A method of claim 7, wherein said air flow regulator further comprises a knife gate.

11. A method of claim 7, wherein said vacuum pump further comprises a variable speed motor.

12. A method of claim 7, wherein said box further comprises a sound-proof exterior.

\* \* \* \* \*